United States Patent
Brandl et al.

(10) Patent No.: US 11,668,195 B2
(45) Date of Patent: Jun. 6, 2023

(54) GAS TURBINE BLADE FOR RE-USING COOLING AIR AND TURBOMACHINE ASSEMBLY AND GAS TURBINE COMPRISING THE SAME

(71) Applicant: DOOSAN ENERBILITY CO., LTD., Changwon-si (KR)

(72) Inventors: Herbert Brandl, Baden (CH); Willy H. Hofmann, Baden (CH); Joerg Krueckels, Baden (CH); Ulrich Rathmann, Baden (CH); Seok Beom Kim, Baden (CH)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/149,762

(22) Filed: Jan. 15, 2021

(65) Prior Publication Data

US 2021/0277781 A1 Sep. 9, 2021

(51) Int. Cl.
*F01D 5/08* (2006.01)
*F01D 5/14* (2006.01)
*F01D 5/18* (2006.01)

(52) U.S. Cl.
CPC ............. *F01D 5/082* (2013.01); *F01D 5/081* (2013.01); *F01D 5/143* (2013.01); *F01D 5/145* (2013.01);
(Continued)

(58) Field of Classification Search
CPC . F01D 5/081; F01D 5/082; F01D 5/08; F01D 5/187; F01D 5/186; F01D 5/143;
(Continued)

(56) References Cited

U.S. PATENT DOCUMENTS 6,158,961 A * 12/2000 Kehl ..................... F01D 5/141
29/527.6
6,261,053 B1 * 7/2001 Anderson ............... F01D 25/12
415/115
(Continued)

FOREIGN PATENT DOCUMENTS

DE 102015203871 A1 9/2016
WO WO-2019/160547 A1 * 8/2019 ............. F01D 5/143

OTHER PUBLICATIONS

English machine translation of DE 10 2015 203 871 A1, Aug. 1, 2022.*

*Primary Examiner* — Christopher Verdier
(74) *Attorney, Agent, or Firm* — Harvest IP Law LLP

(57) ABSTRACT

The present technique presents a gas turbine blade for re-using cooling air, a turbomachine assembly having the blade, and a gas turbine having the turbomachine assembly. The blade includes a platform and an airfoil extending from the platform. The airfoil includes a pressure surface, a suction surface, a leading edge and a trailing edge. The platform includes a pressure side, a suction side, a leading-edge side and a trailing-edge side, disposed towards the pressure surface, the suction surface, the leading edge and the trailing edge of the airfoil, respectively. The suction side of the platform includes a part of the upper surface and a suction-side lateral surface of the platform. At least a part of an edge between the suction-side lateral surface and the upper surface of the platform comprises a chamfer part.

15 Claims, 16 Drawing Sheets

(52) U.S. Cl.
CPC .............. *F01D 5/186* (2013.01); *F01D 5/187* (2013.01); *F05D 2240/81* (2013.01); *F05D 2250/192* (2013.01); *F05D 2260/20* (2013.01); *F05D 2260/201* (2013.01); *F05D 2260/202* (2013.01); *F05D 2260/205* (2013.01)

(58) Field of Classification Search
CPC ...... F01D 5/145; F01D 11/008; F01D 11/006; F05D 2240/80; F05D 2240/81; F05D 2260/20; F05D 2260/202; F05D 2260/205; F05D 2250/192; F05D 2260/201
See application file for complete search history.

(56) References Cited

U.S. PATENT DOCUMENTS

| | | | |
|---|---|---|---|
| 2007/0140848 A1* | 6/2007 | Charbonneau | F01D 5/20 416/96 R |
| 2013/0315745 A1* | 11/2013 | Aggarwala | F01D 11/006 416/223 A |
| 2015/0354369 A1* | 12/2015 | Chlus | F01D 5/143 416/96 R |
| 2016/0003074 A1* | 1/2016 | Chlus | F01D 9/042 415/177 |
| 2016/0201469 A1* | 7/2016 | Lewis | F01D 9/041 415/115 |
| 2016/0258294 A1* | 9/2016 | Weinert | F01D 5/10 |
| 2016/0305254 A1* | 10/2016 | Snyder | F01D 11/006 |
| 2017/0022839 A1 | 1/2017 | Lewis et al. | |
| 2018/0363477 A1* | 12/2018 | Hafner | F23R 3/002 |
| 2020/0256195 A1* | 8/2020 | Khoun | F01D 5/141 |
| 2021/0040855 A1* | 2/2021 | Gustafson | F01D 5/141 |

* cited by examiner

GAS TURBINE BLADE FOR RE-USING COOLING AIR AND TURBOMACHINE ASSEMBLY AND GAS TURBINE COMPRISING THE SAME

CROSS-REFERENCE TO RELATED APPLICATION

This application claims priority to German Patent Application No. 10 2020 103 898.4, filed on Feb. 14, 2020, the disclosure of which is incorporated herein by reference in its entirety.

BACKGROUND OF THE INVENTION

Field of the Invention

The present invention relates to gas turbines, and to a turbomachine assembly, more particularly to turbine blades for re-using cooling air used for gas turbines and turbomachine assemblies.

Description of the Related Art

Cooling of a gas turbine blade (hereinafter also referred to as blade) is performed by various ways. Efficient cooling of the blades results in increased efficiency of the gas turbine and enhances operation life of the blades and therefore of the gas turbine.

The blade generally comprises of an airfoil (also referred to as an aerofoil) which extends from an upper surface of a platform and a root which extends from a lower surface of the platform in a direction opposite to the airfoil. During operation of the gas turbine, the airfoil and the upper surface of the platform are in the hot gas path of the gas turbine. One of the regions of the blade which is exposed to high mechanical and thermal stresses during operation of the gas turbine and which therefore is susceptible to mechanical fatigue, and eventual failure, is the region where the airfoil meets the upper surface of the platform. Therefore, it is advantageous to cool this transition region, i.e., the region where the airfoil meets/joins the upper surface of the platform, to enhance operation life or cyclic lifetime of the blades, and therefore of the gas turbine.

For cooling of components of the gas turbine, a part of the air from the compressor section of the gas turbine is withdrawn or external cooling air used as cooling air. Therefore, it is advantageous that once the cooling air has been used to cool a part of the gas turbine, the same cooling air is then re-used to cool another part of the gas turbine.

Thus, an object of the present disclosure is to provide a blade for a gas turbine wherein the transition region, i.e., the region where the airfoil meets/joins the upper surface of the platform, or regions of the platform adjoining the transition region (hereinafter also referred to as the adjoining regions) are efficiently cooled. It is beneficial if the cooling of the transition region and/or of the adjoining regions is performed by cooling air that is being re-used, i.e., the cooling air being used for cooling of the transition region and/or of the adjoining regions has been used previously to cool another part of the gas turbine or has been used for another purpose, for example, has been used as seal purge air for a seal between two adjacent blades arranged on a rotor disk of the gas turbine.

SUMMARY OF THE INVENTION

The above objects are achieved by a blade for a gas turbine according to claim 1. Advantageous embodiments are provided in dependent claims. Features of the independent claim may be combined with features of claims dependent on the independent claim, and features of dependent claims can be combined with each other.

In a first aspect of the present technique, a blade for a gas turbine is provided. The blade includes a platform and an airfoil extending from the platform. The platform may include an upper surface and the airfoil may extend from the upper surface of the platform.

The airfoil includes a pressure surface and a suction surface that meet each other at a leading edge and a trailing edge of the airfoil.

The platform includes: a pressure side disposed towards the pressure surface of the airfoil, a suction side disposed towards the suction surface of the airfoil, a leading-edge side disposed towards the leading edge of the airfoil and a trailing-edge side disposed towards the trailing edge of the airfoil.

The pressure side of the platform may include a pressure-side lateral surface. The pressure side of the platform may include a part (hereinafter also referred to as the pressure-side part) of the upper surface of the platform.

The suction side of the platform may include a suction-side lateral surface. The suction side of the platform may include a part (hereinafter also referred to as the suction-side part) of the upper surface of the platform.

The suction-side lateral surface and the pressure-side lateral surface of the platform may be opposite side surfaces of the platform, facing away from each other.

In the blade at least a part of an edge between the suction-side lateral surface and the upper surface of the platform comprises a chamfer part.

Preferably, the chamfer part is provided at a rotating blade of the gas turbine.

The leading-edge side of the platform may include a leading-edge lateral surface.

The chamfer part may be spaced apart from the leading-edge lateral surface.

The trailing-edge side of the platform may include a trailing-edge lateral surface.

The chamfer part may be spaced apart from the trailing-edge lateral surface.

Alternatively, the chamfer part may be continuous with the trailing-edge lateral surface i.e., the chamfer part may start at the trailing-edge lateral surface, and may extend towards the leading-edge lateral surface of the platform.

In the blade, a ratio of a chord length of the airfoil and a length of the chamfer part may be greater than or equal to 1.05 and less than or equal to 8.1.

The chord length is preferably taken at a height of 5%-10% of the height of the airfoil or blade over the platform surface. The chord length may be measured at a planar section area of the airfoil parallel to the rotation axis. It may be measured from the leading edge to the trailing edge, specifically by taking the maximum distance between the leading edge to the trailing edge, the measurement points being at lines having a right angle to the suction-side lateral surface or pressure-side lateral surface.

In the blade, a slope of the chamfer part may be greater than or equal to 0.8 and less than or equal to 3, i.e. slope of the chamfer part may be between 0.8 and 3.

In the blade, a ratio of a chord length of the airfoil and a length of a first non-chamfered edge region may be greater than or equal to 1.03 and less than or equal to 5.9. The first non-chamfered edge region may be at least a part of the edge between the suction-side lateral surface and the upper surface of the platform. The first non-chamfered edge region may be laterally disposed between a starting point of a chord of the airfoil at the leading edge of the airfoil and the chamfer part, when viewed in a direction perpendicular to the chord of the airfoil. The lengths may be measured parallel to the chord of the airfoil.

The platform may include a lower surface opposite to the upper surface of the platform. The chamfer part may be spaced apart from the lower surface by a part of the suction-side lateral surface.

The blade may include a fillet disposed around at least a part of the airfoil. The fillet may be disposed in or at a region where the airfoil joins the platform. At least a part of the fillet may be disposed between the airfoil and the chamfer part. In other words, at least a part of the fillet may be disposed directly in-between the suction surface of the airfoil and the chamfer part when viewed in a direction perpendicular to the chord of the airfoil.

The blade may include one or more cooling channels formed in the platform. At least one of the one or more cooling channels may include an outlet for cooling air. The outlet may be disposed at the pressure-side lateral surface of the platform.

The leading-edge side of the platform may include a leading-edge lateral surface.

In the blade, a distance of the outlet from the leading-edge lateral surface of the platform may be less than a distance of the chamfer part from the leading-edge lateral surface of the platform. The distances may be measured parallel to the chord of the airfoil.

Optionally in addition to the aforementioned, a difference between the distances may be less than the distance of the outlet from the leading-edge lateral surface of the platform. The distances may be measured parallel to the chord of the airfoil.

In the blade, a distance of the outlet from the leading-edge lateral surface of the platform may be equal to or greater than a distance of the chamfer part from the leading-edge lateral surface of the platform, and/or equal to or lesser than a sum of the distance of the chamfer part from the leading-edge lateral surface of the platform and a length of the chamfer part. The length of the chamfer part and the distances may be measured parallel to the chord of the airfoil.

In a second aspect of the present technique, a turbomachine assembly, hereinafter also referred to as the assembly, is presented. The assembly includes a plurality of blades arranged on a rotor disk. The plurality of blades includes at least one first blade. The at least one first blade is a blade according to any of the above embodiments of the blade presented hereinabove according to the first aspect of the present technique. A cooling air flow path may be disposed adjacent to the suction-side lateral surface of the first blade.

In the assembly, the plurality of blades may include at least one second blade disposed adjacent to the at least one first blade. The at least one second blade may be a blade comprising the chamfer part as disclosed hereinabove, in the first aspect of the present technique, and may further include the one or more cooling channels formed in the platform and having the outlet disposed at the pressure-side lateral surface of the platform, as discussed hereinabove.

In a most preferred embodiment, all blades may be identical and may comprise cooling holes on the pressure side and/or maybe on the suction side of the platform and all blades may have the chamfer part.

The cooling air flow path may be disposed between the second blade and the suction-side lateral surface of the first blade.

In the assembly, the plurality of blades may include at least one third blade disposed adjacent to the at least one first blade.

The at least one third blade disposed adjacent to the at least one first blade, includes a platform and an airfoil extending from the platform. The platform may include an upper surface and the airfoil may extend from the upper surface of the platform.

The airfoil of the third blade includes a pressure surface (also referred to as pressure side or concave surface/side) and a suction surface (also referred to as suction side or convex surface/side). The pressure surface and the suction surface meet each other at a leading edge and a trailing edge of the airfoil of the third blade.

The platform of the third blade includes: a pressure side disposed towards the pressure surface of the airfoil, a suction side disposed towards the suction surface of the airfoil, a leading-edge side disposed towards the leading edge of the airfoil and trailing-edge side disposed towards the trailing edge of the airfoil.

The pressure side of the platform of the third blade may include a pressure-side lateral surface. The pressure side of the platform may include a part (hereinafter also referred to as the pressure-side part) of the upper surface of the platform of the third blade.

The suction side of the platform of the third blade may include a suction-side lateral surface. The suction side of the platform of the third blade may include a part (hereinafter also referred to as the suction-side part) of the upper surface of the platform of the third blade.

The third blade further comprises one or more cooling channels formed in the platform of the third blade, and wherein at least one of the one or more cooling channels of the third blade comprises an outlet for cooling air and wherein the outlet is disposed at the pressure-side lateral surface of the platform of the third blade.

In the assembly, a distance of the outlet of the third blade from the leading-edge lateral surface of the platform of the third blade may be less than a distance of the chamfer part of the first blade from the leading-edge lateral surface of the platform of the first blade. The distances may be measured parallel to chords of the airfoils of the respective blades.

In the assembly, a distance of the outlet of the third blade from the leading-edge lateral surface of the platform of the third blade may be less than a distance of the chamfer part of the first blade from the leading-edge lateral surface of the platform of the first blade. Additionally, a difference between the distances may be less than the distance of the outlet of the third blade from the leading-edge lateral surface of the platform of the third blade. The distances may be measured parallel to chords of the airfoils of the respective blades.

In the assembly, the outlet of the at least one of the one or more cooling channels of the third blade may be positioned directly facing the chamfer part of the first blade.

Preferably, the cooling channel and the chamfer part are at the same radial distance.

In the assembly, a distance between a lower edge of the chamfer part of the at least one first blade and the pressure-side lateral surface of the blade disposed adjacent to the at least one first blade may be equal to or greater than 0.5 times and equal to or less than 3 times a horizontal distance between the lower edge of the chamfer part and an upper edge (i.e. an edge or boundary of the chamfer part adjoining the upper surface of the platform) of the chamfer part.

In a third aspect of the present technique a gas turbine is presented. The gas turbine includes a turbomachine assembly. The turbomachine assembly is according to any of the above embodiments of the assembly presented hereinabove according to the second aspect of the present technique.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein.

DESCRIPTION OF SPECIFIC EMBODIMENTS

Figure 1:
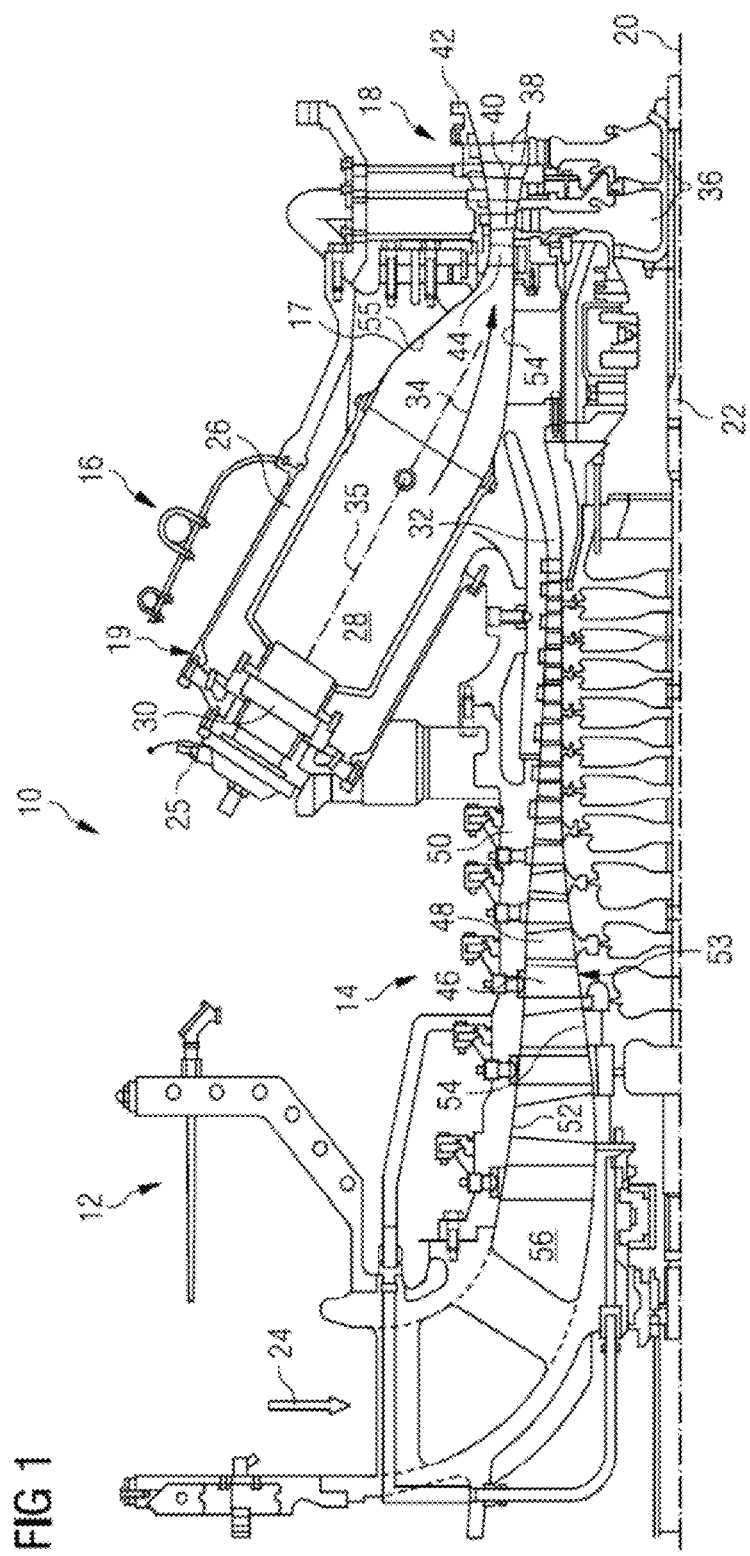
FIG. 1 shows part of a gas turbine in a sectional view and in which a blade of the present technique is incorporated.

Hereinafter, above-mentioned and other features of the present technique are described in detail. Various embodiments are described with reference to the drawing, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

FIG. 1 shows an example of a gas turbine 10 in a sectional view. The gas turbine 10 may comprise, in flow series, an inlet 12, a compressor or compressor section 14, a combustor section 16 and a turbine section 18 which are generally arranged in flow series and generally about and in the direction of a longitudinal or rotational axis 20. The gas turbine 10 may further comprise a shaft 22 which is rotatable about the rotational axis 20 and which extends longitudinally through the gas turbine 10. The shaft 22 may drivingly connect the turbine section 18 to the compressor section 14.

In operation of the gas turbine 10, air 24, which is taken in through the air inlet 12 is compressed by the compressor section 14 and delivered to the combustion section or burner section 16. The burner section 16 may comprise a burner plenum 26, one or more combustion chambers 28 and at least one burner 30 fixed to each combustion chamber 28. The combustion chambers 28 and the burners 30 may be located inside the burner plenum 26. The compressed air passing through the compressor 14 may enter a diffuser 32 and may be discharged from the diffuser 32 into the burner plenum 26 from where a portion of the air may enter the burner 30 and is mixed with a gaseous or liquid fuel. The air/fuel mixture is then burned and the combustion gas 34 or working gas from the combustion is channeled through the combustion chamber 28 to the turbine section 18 via a transition duct 17.

This exemplary gas turbine 10 may have a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets may form an annulus for channeling the combustion gases to the turbine 18.

The turbine section 18 may comprise a number of blade carrying discs 36. The shaft is composed of the compressor discs, drum (below the combustor section) and turbine discs being all kept together by a one center tie bolt or many fit bolts tying the discs. In the present example, two discs 36 each carry an annular array of turbine blades 38 are depicted. However, the number of blade carrying discs could be different, i.e., only one disc or more than two discs. In addition, guiding vanes 40, which are fixed to a stator 42 of the gas turbine 10, may be disposed between the rows of annular arrays of turbine blades 38. Between the exit of the combustion chamber 28 and the leading turbine blades 38 inlet guiding vanes 44 may be provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimize the angle of the combustion or working gas on the turbine blades 38.

The turbine section 18 drives the compressor section 14. The compressor section 14 comprises rotating and non-rotating airfoils, in particular of an axial series of vane rows 46 and rotor blade rows 48. The rotor blade rows 48 may comprise a rotor disc supporting an annular array of blades. The compressor section 14 may also comprise a casing 50 that surrounds the rotor rows and supports the vane rows 48. The guide vane rows may include an annular array of radially extending vanes that are mounted to the casing 50. The vanes are provided to present gas flow at an optimal angle for the blades at a given turbine operational point. Some of the guide vane rows may have variable vanes, where the angle of the vanes, about their own longitudinal axis, can be adjusted for angle according to air flow characteristics that can occur at different turbine operations conditions. The casing 50 may define a radially outer surface 52 of the passage 56 of the compressor 14. A radially inner surface 54 of the passage 56 may be at least partly defined by a rotor drum 53 of the rotor which may be partly defined by the annular array of blades 48.

The present technique is described with reference to the above exemplary gas turbine having a single shaft or spool connecting a single, multi-stage compressor and a single, one or more stage turbine. However, it should be appreciated that the present technique is equally applicable to two or three shaft gas turbines and which can be used for industrial, aero or marine applications.

The terms upstream and downstream refer to the flow direction of the airflow and/or working gas flow through the gas turbine unless otherwise stated. The terms forward and rearward refer to the general flow of gas through the gas turbine. The terms axial, radial and circumferential are made with reference to the rotational axis 20 of the gas turbine.

Figure 2:
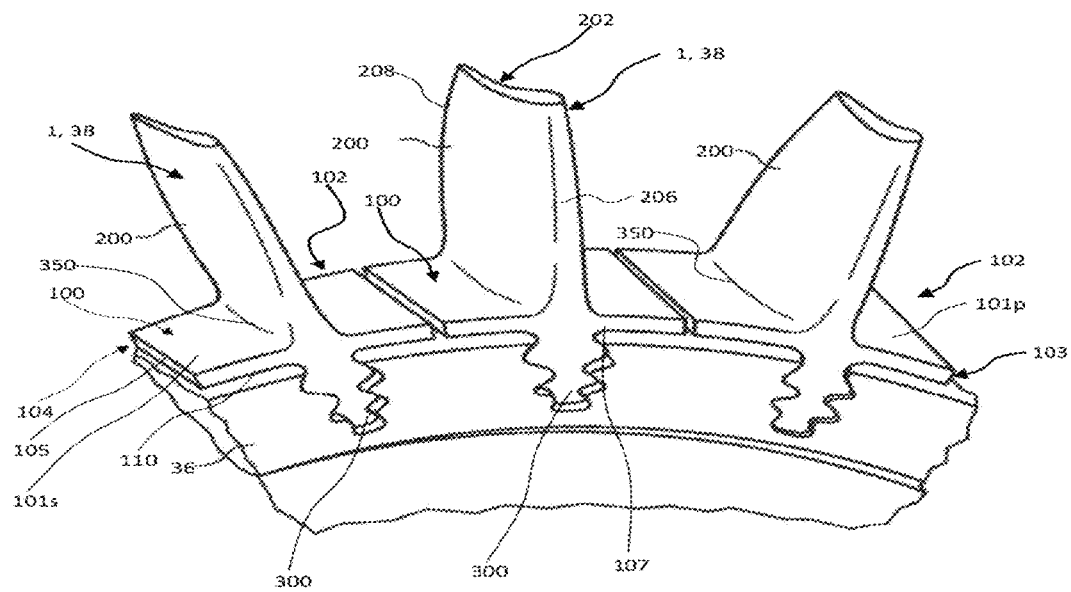
FIG. 2 schematically illustrates a turbomachine assembly to which a blade of the present technique is applied.

FIG. 2 schematically depicts an example of a turbomachine assembly. The assembly may include the turbine blades 38 arranged on the rotor disk 36. The turbine blade 38 may include a platform 100, an airfoil 200 and a root 300. The blade 38 may be fixed to or mounted onto the disk 36 via the root 300. According to the present technique, at least one, and preferably a plurality or all, of the blades 38 include a chamfer part (although not shown in FIG. 2).

Figure 3:
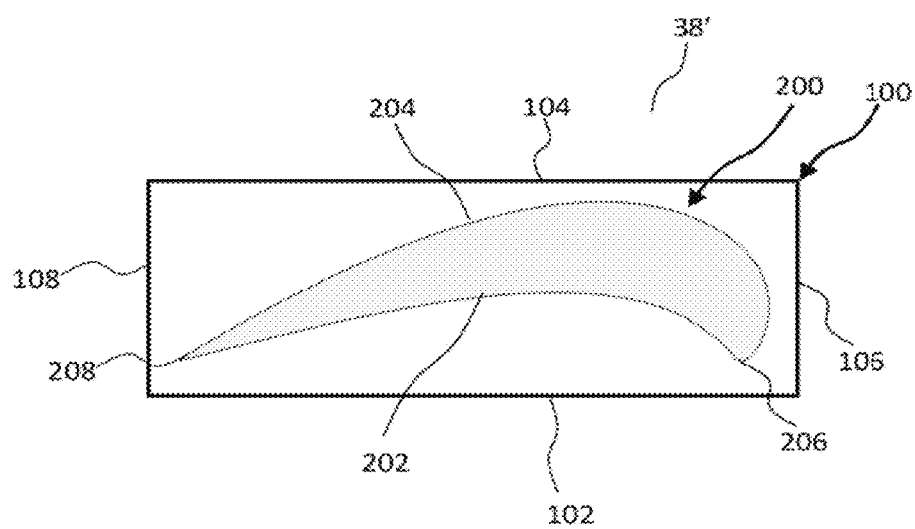
FIG. 3 schematically illustrates a top view of a conventional blade of a gas turbine.

Hereinafter, a blade 1 according to the present technique has been explained with reference to FIG. 4A and FIG. 2 in comparison with FIG. 3. FIG. 3 represents a conventional blade 38' for comparing with the blade 1 of the present technique.

The blade 1 includes a platform 100 and an airfoil 200 extending from the platform 100. The platform 100 may include an upper surface 101 and a lower surface 110. The airfoil 200 may extend from the upper surface 101 of the platform 100. The upper surface 101 extends circumferentially. Similarly, the lower surface 110 extends circumferentially. The airfoil 200 extends radially outwards from the upper surface 101 of the platform 100.

The airfoil 200 includes a pressure surface 202 (also referred to as pressure side or concave surface/side) and a suction surface 204 (also referred to as suction side or convex surface/side). The pressure surface 202 and the suction surface 204 meet each other at a leading edge 206 and a trailing edge 208 of the airfoil 200.

The platform 100 includes: a pressure side 102 disposed towards the pressure surface 202 of the airfoil 200, a suction side 104 disposed towards the suction surface 204 of the airfoil 200, a leading-edge side 106 disposed towards the leading edge 206 of the airfoil 200 and a trailing-edge side 108 disposed towards the trailing edge 208 of the airfoil 200.

The pressure side 102 of the platform 100 may include a part 101p (hereinafter also referred to as the pressure-side part 101p) of the upper surface 100 and a pressure-side lateral surface 103. The pressure-side lateral surface 103 may be substantially perpendicularly disposed with respect to the upper surface 101 of the platform 100. The pressure-side lateral surface 103 may extend from the upper surface 101 of the platform 100 in a direction opposite to a direction in which the airfoil 200 extends from the upper surface 101 of the platform 100.

The pressure-side lateral surface 103 may be generally radially disposed, when the blade 1 is arranged on the rotary disk 36 of the turbine 10. The pressure-side part 101p of the upper surface 101 of the platform 100 may be understood as a region of the upper surface 101 of the platform 100 that is disposed between the pressure surface 202 of the airfoil 200 and the pressure-side lateral surface 103 of the platform 100.

The suction side 104 of the platform 100 may include a part 101s (hereinafter also referred to as the suction-side part 101s) of the upper surface 101 and a suction-side lateral surface 105. The suction-side lateral surface 105 may be substantially perpendicularly disposed with respect to the upper surface 101 of the platform 100.

The suction-side lateral surface 105 may extend from the upper surface 101 of the platform 100 in a direction opposite to the direction in which the airfoil 200 extends from the upper surface 101 of the platform 100.

The upper surface 101 of the platform 100 includes the pressure-side part 101p and the suction-side part 101s.

The suction-side lateral surface 105 may be generally radially disposed, when the blade 1 is arranged on the rotary disk 36 of the turbine 10. The suction-side part 104 of the upper surface 101 of the platform 100 may be understood as a region of the upper surface 101 of the platform 100 that is disposed between the suction surface 204 of the airfoil 200 and the suction-side lateral surface 105 of the platform 100.

The suction-side lateral surface 105 and the pressure-side lateral surface 103 of the platform 100 may be opposite side surfaces of the platform 100, facing away from each other. The suction-side lateral surface 105 and the pressure-side lateral surface 103 of the platform 100 may be disposed substantially parallel (moderate skew angles are common) to the axis 20 (shown in FIG. 1) and/or perpendicular to the circumferential direction.

In the blade 1 at least a part of an edge between the suction-side lateral surface 105 and the upper surface 101 of the platform 100 comprises a chamfer part 9. More particularly, in the blade 1 at least a part of an edge between the suction-side lateral surface 105 and the suction-side part 101s of the upper surface 101 of the platform 100 comprises the chamfer part 9.

Figure 4A:
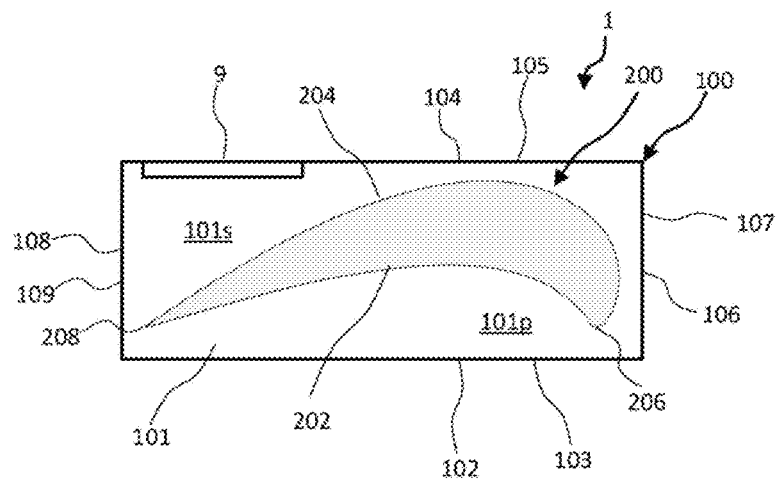
FIG. 4A schematically illustrates a top view of an exemplary embodiment of a blade of a gas turbine according to the present technique.

Compared to the conventional blade 38' shown in FIG. 3, the chamfer part 9 is present in the blade 1 as shown in FIG. 4A according to the present technique.

The chamfer part 9 may be understood as a transitional edge region between two faces, i.e. between at least a part of the suction-side lateral surface 105 and at least a part of the upper surface 101 of the platform 100 of the blade 1. The chamfer part 9 may be understood as an inclined surface intervening as a transitional region between at least a part, or preferably only a part, of the suction-side lateral surface 105 and at least a part, or preferably only a part, of the upper surface 101 of the platform 100 of the blade 1.

The chamfer part 9 may extend longitudinally i.e. may have an elongated shape. The longitudinal axis (not shown) of the chamfer part 9 may be aligned, i.e. may be extended along or may be parallel to, a direction that extends from the leading-edge side 106 of the platform 100 towards the trailing-edge side 108 of the platform 100.

The chamfer part 9 may extend along an entire length of the suction-side lateral surface 105 of the platform 100 of the blade 1.

Alternatively, the chamfer part 9 may extend along only a part of entire length of the suction-side lateral surface 105 of the platform 100 of the blade 1. Thus, the chamfer part 9 may be limited in a part (say first part) of the edge between the suction-side lateral surface 105 and the upper surface 101 of the platform 1, whereas another part or parts (say second part or parts) of the edge between the suction-side lateral surface 105 and the upper surface 101 of the platform may not be chamfered. Thus, in the second part or parts, the suction-side lateral surface 105 may be contiguous with or adjoining the upper surface 101 of the platform 100. When there are multiple non-chamfered parts, i.e. the second parts, the first part may be disposed in-between the two second parts.

The chamfer part 9 may include an upper edge 9a (shown in FIG. 12B) of the chamfer part 9 and a lower edge 9b (shown in FIG. 12A) of the chamfer part 9. The upper edge 9a and the lower edge 9b of the chamfer part 9 may be aligned, i.e. may be extended along or may be parallel to, with a direction that extends from the leading-edge side 106 of the platform 100 towards the trailing-edge side 108 of the platform 100. The upper edge 9a and the lower edge 9b of the chamfer part 9 may be radially spaced apart. The upper edge 9a and/or the lower edge 9b of the chamfer part 9 may be rounded.

Figure 4B:
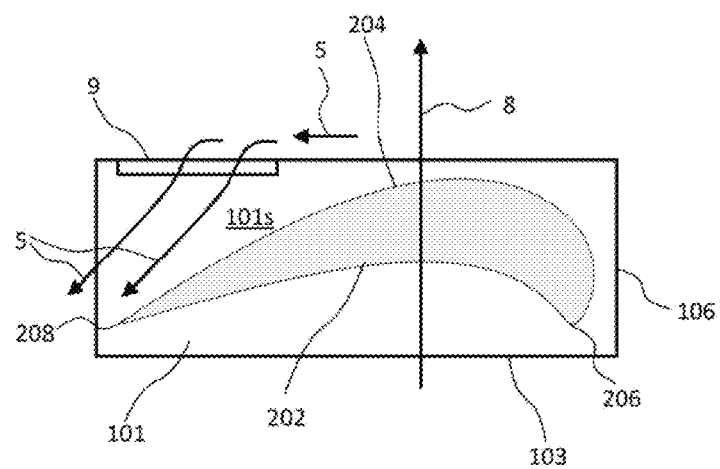
FIG. 4B schematically illustrates the working of the blade of the present technique for cooling a transition region where an airfoil meets a platform of the blade and/or for cooling region(s) of the platform adjoining the transition region, in accordance with the present technique.

FIG. 4B schematically illustrates the working of the blade 1 of the present technique, for example the blade 1 of FIG. 4A for cooling a transition region where the airfoil 200 meets the platform 100 of the blade 1 and/or for cooling region(s) of the platform 100 e.g. a part of the suction-side part 101s of the upper surface 101 that adjoins the transition region, in accordance with the present technique.

As shown in FIG. 4B, when the blade 1 of the present technique is installed in the exemplary turbine 10 and when the turbine 10 is operated, the blades 1 are turned or rotated in the circumferential direction shown by the arrow marked with reference sign 8 in FIG. 4B. As a result of the flow field, any cooling air 5 that is present adjacent to the suction-side lateral surface 105 of the platform 100 tends to move towards the suction surface 204, the chamfer part 9 facilitates this movement of the cooling air 5 because of the inclined surface of the chamfer part 9, as compared to a blade, e.g. the conventional blade 38' shown in FIG. 3, which does not include the chamfer part 9 of the present technique.

Generally, the air stream inside an axial gas turbine can be differentiated into hot gas main air stream and hot gas secondary air stream. The hot gas main air stream flows axially through the sections of the gas turbine. With respect to the present invention it passes through the rows of blades in the turbine part. I.e. due to the slower laminar flow of the gas at the walls of the blades a secondary air stream is generated, which is mainly perpendicular to the main air stream. Examples for the secondary air stream are horseshoe vortex, tip vortex and passage vortex. The passage vortex is generated at the suction side at the transition area to the platform. The passage vortex is fed by air from the laminar layer travelling from the pressure side to the suction side and is sucked by the suction side of the blade and is streaming at the suction side of the blade which prevents an efficient film cooling at the suction side of the blades. This reduces the cooling efficiency at the suction side and requires further measures to cool the suction side of the blades. For improving the cooling the chamfer part is provided.

Due to the internal construction of the rows of blades there is cooling air/leakage air 5 present in the gap between the lateral faces of the platform. This air intends to stay in the gap and follows the lower pressure at the trailing edge of the axial platform. The cooling/leakage air in the gap can be caused, i.e. by the upstreaming air from the cavity between the rows of blades, upstreaming air between the platforms from the roots and/or air provided by the cooling holes inside the platforms.

By providing the chamfer part 9 the cooling air 5 will be entrained by the hot gas secondary air and due to the cross-sectional area increase in the gap the adverse pressure is increased and the cooling air inside the gap will be pushed out of the gap and is directed to the transition region and/or of the adjoining regions of the blade.

The pressure for the leakage/cooling air streaming between the blades will increase in the chamfer part 9 due to the increase of the sectional area. This forces the air streaming inside the gap between the blades to the transition region and/or of the adjoining regions, i.e. the leakage/cooling air is deflected to the transition and/or adjoining regions to increase the cooling effect at these critical portions of the blade. Due to the improved cooling the durability of the blade is strongly increased.

The cooling air 5 being used for cooling of the transition region and/or of the adjoining regions may have been used previously to cool another part of the blade (e.g. platform) or may have been used for another purpose for example, used as seal purge air for a seal between two adjoining blades of the gas turbine arranged on the rotor disk 36.

The chamfer part 9 may facilitate or direct flow of cooling air 5 from a side of the suction-side lateral surface 105 of the platform 100, over the suction-side part 101s of the upper surface 101 of the platform 100 towards the suction surface 204 of the airfoil 200, and particularly towards a part of the suction surface 204 present in the vicinity of the trailing edge 208 of the airfoil 200, optionally including the trailing edge 208 of the airfoil 200.

Alternatively or additionally, the chamfer part 9 may facilitate or direct flow of cooling air over the suction-side part 101s of the upper surface 101 towards the trailing edge 208 of the airfoil 200. As a result, the transition region where the airfoil 200 meets the platform 100 of the blade 1 and/or at least a part of the suction-side part 101s of the upper surface 101 adjoining the transition region is cooled.

Figure 9A:
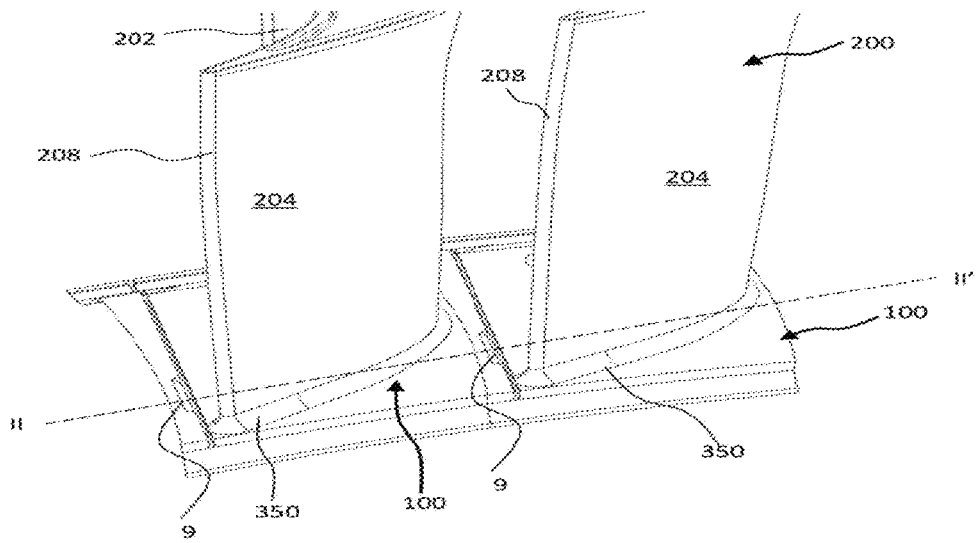
FIG. 9A is a perspective view illustrating an exemplary embodiment of a turbomachine assembly of the present technique in which a blade of the present technique is incorporated.
Figure 9B:
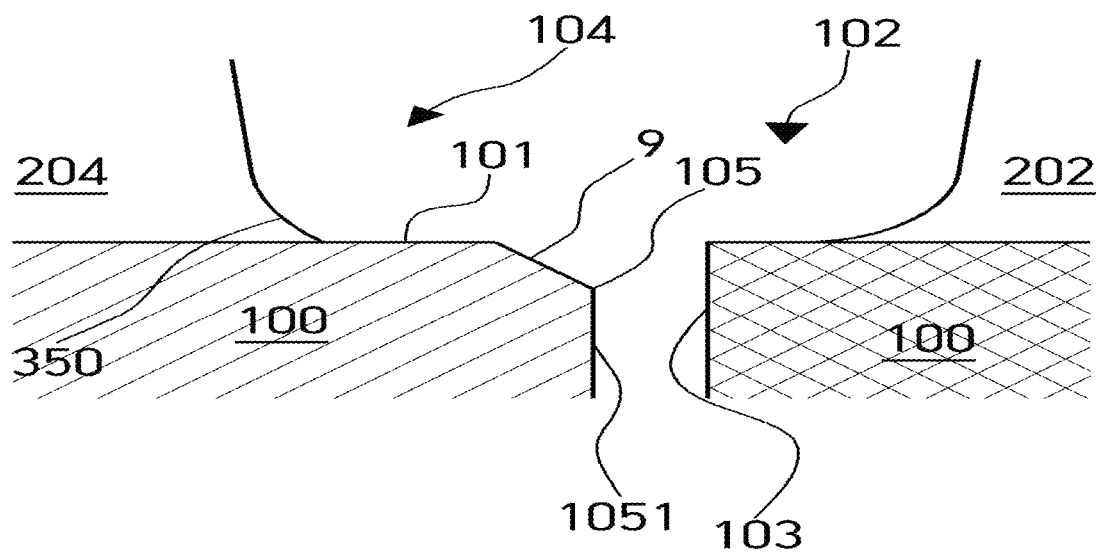
FIG. 9B illustrates a part of a cross-sectional view of the turbomachine assembly of FIG. 9A, cross-sectioned at line II-II'.

The transition region where the airfoil 200 meets the platform 100 of the blade 1 may optionally include a fillet 350 (as shown in FIG. 2, and also in FIG. 9B).

The fillet 350 may be disposed around at least a part of the airfoil 200. The fillet 350 may be disposed in or at a region where the airfoil 200 joins the platform 100. At least a part of the fillet 350 may be disposed between the airfoil 200 and the chamfer part 9, when viewed perpendicular to the chord of the airfoil. In other words, at least a part of the fillet 350 may be disposed directly in-between the suction surface 204 of the airfoil 200 and the chamfer part 9 when viewed in a direction perpendicular to the chord C (shown in FIG. 12A) of the airfoil 200.

As described above, the chord length C is preferably taken at a height of 5%-10% of the height of the airfoil or blade 1 over the platform surface. The chord length C may be measured at a planar section area of the airfoil parallel to the rotation axis. It may be measured from the leading edge to the trailing edge, specifically by taking the maximum distance between the leading edge to the trailing edge. The measurement points being at lines having a right angle to the suction-side lateral surface or pressure-side lateral surface.

The chamfer part 9 may facilitate or direct flow of cooling air 5 over the suction-side part 101s of the upper surface 101 towards the fillet 350, more particularly towards the part of the fillet 350 disposed between the airfoil 200 and the chamfer part 9. As a result, the fillet 350 of the blade 1 and/or at least a part of the suction-side part 101s of the upper surface 101 adjoining the fillet 1 is cooled.

Hereinafter, some other aspects of the blade 1 of the present technique are explained with reference to FIGS. 5 and 6 in combination with FIGS. 2 and 4A.

The leading-edge side 106 of the platform 100 may include a leading-edge lateral surface 107. The leading-edge lateral surface 107 may be substantially perpendicularly disposed with respect to the upper surface 101 of the platform 100 and may extend from the upper surface 101 of the platform 100 in a direction opposite to the direction in which the airfoil 200 extends from the upper surface 101 of the platform 100. The leading-edge lateral surface 107 may be generally radially disposed, when the blade 1 is arranged on the rotary disk 36 of the turbine. The leading-edge lateral surface 107 may be generally perpendicularly disposed to the axis 20 (shown in FIG. 1), when the blade 1 is arranged on the rotary disk 36 of the turbine. The leading-edge lateral surface 107 may be disposed between suction-side lateral surface 105 and the pressure-side lateral surface 103 of the platform 100.

Figure 5:
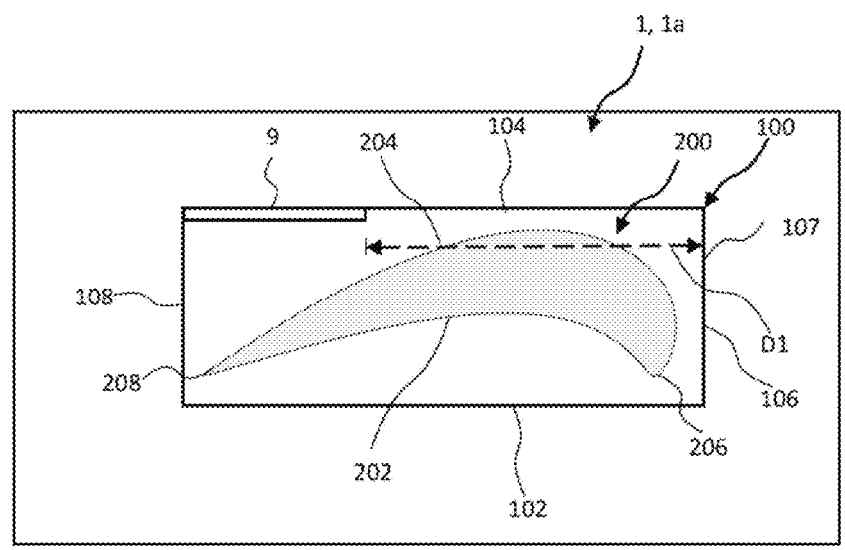
FIG. 5 schematically illustrates a top view of another exemplary embodiment of the blade according to the present technique.
Figure 6:
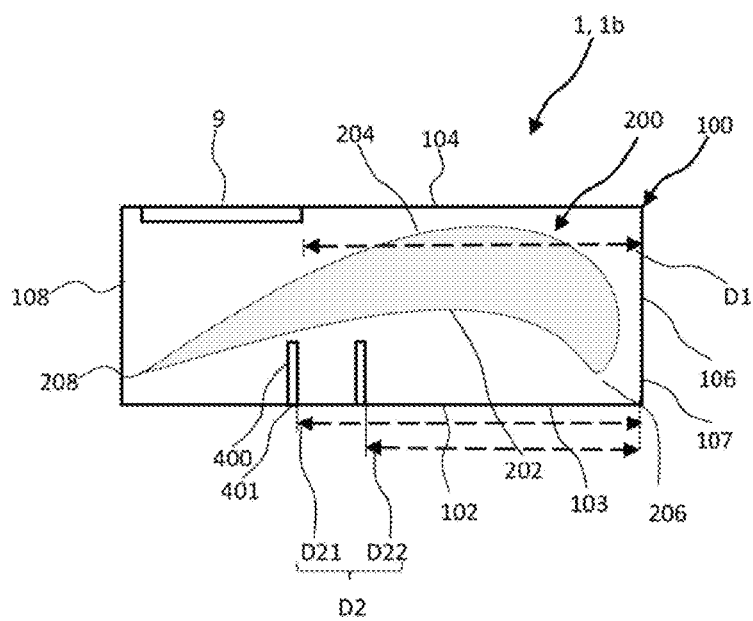
FIG. 6 schematically illustrates a top view of yet another exemplary embodiment of the blade according to the present technique.

As shown in FIGS. 4A, 5 and 6, the chamfer part 9 may be spaced apart from the leading-edge lateral surface 107 of the platform 100.

As shown in FIGS. 4A, 5 and 6, the trailing-edge side 108 of the platform 100 may include a trailing-edge lateral surface 109. The trailing-edge lateral surface 109 may be substantially perpendicularly disposed with respect to the upper surface 101 of the platform 100 and may extend from the upper surface 101 of the platform 100 in a direction opposite to the direction in which the airfoil 200 extends from the upper surface 101 of the platform 100.

The trailing-edge lateral surface 109 may be generally radially disposed, when the blade 1 is arranged on the rotary disk 36 of the turbine. The trailing-edge lateral surface 109 may be generally perpendicularly disposed to the axis 20 (shown in FIG. 1), when the blade 1 is arranged on the rotary disk 36 of the turbine. The trailing-edge lateral surface 109 may be disposed between suction-side lateral surface 105 and the pressure-side lateral surface 103 of the platform 100.

The leading-edge lateral surface 107 and the trailing-edge lateral surface 109 of the platform 100 may be opposite side surfaces of the platform 100, facing away from each other. When the blade 1 is installed in the gas turbine, the leading-edge lateral surface 107 and the trailing-edge lateral surface 109 of the platform 100 may be axially spaced apart.

As shown in FIGS. 4A and 6, the chamfer part 9 may be spaced apart from the trailing-edge lateral surface 109.

Alternatively, as shown in FIG. 5, the chamfer part 9 may be continuous with the trailing-edge lateral surface 109 i.e. the chamfer part 9 may start at the trailing-edge lateral surface 109 and may extend towards the leading-edge lateral surface 107 of the platform 100.

Hereinafter, referring to FIG. 6 and FIGS. 12A, 12B and 12C some exemplary dimensions of the blade 1 are explained.

Figure 12A:
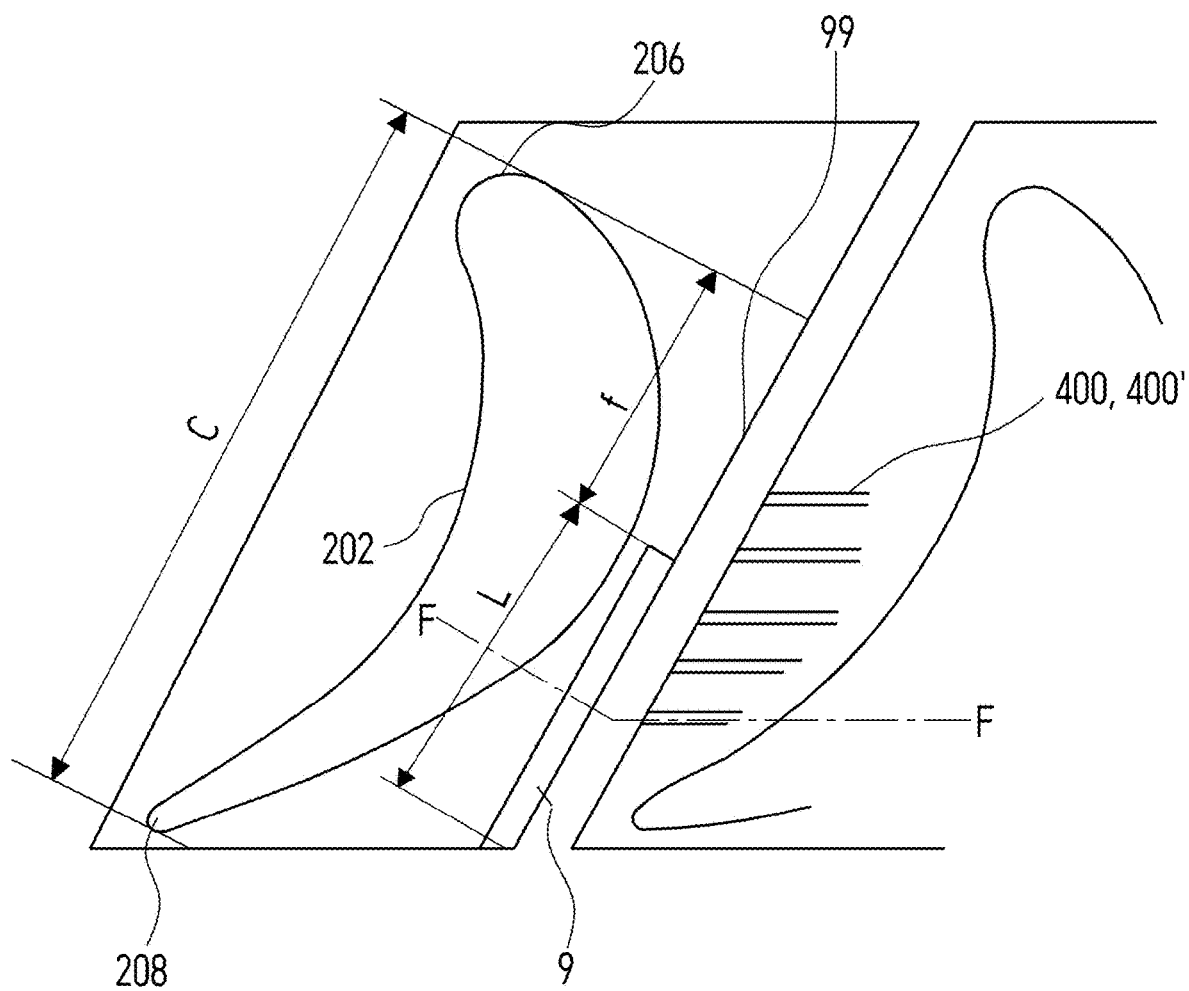
FIG. 12A schematically illustrates the turbomachine assembly of FIG. 11A and schematically depicts exemplary dimensions of the blade of the present technique.

As shown in FIG. 12A, in the blade 1, a ratio (C/L) of a chord length C of the airfoil 200 and a length L of the chamfer part 9 may be greater than or equal to 1.05 and less than or equal to 8.1, i.e. simply put the ratio may be between 1.05 and 8.1. The length L of the chamfer part 9 may be measured parallel to a chord of the airfoil 200.

A chord may be understood as an imaginary straight line joining the leading edge 206 and the trailing edge 208 of the airfoil 200. The chord length C may be a distance between the trailing edge 208 and a point where the chord C intersects the leading edge 206.

The abovementioned ratio (C/L) is applicable for either of the embodiments of the blade 1 depicted in FIG. 4A or in FIG. 4 or in FIG. 6.

Figure 12B:
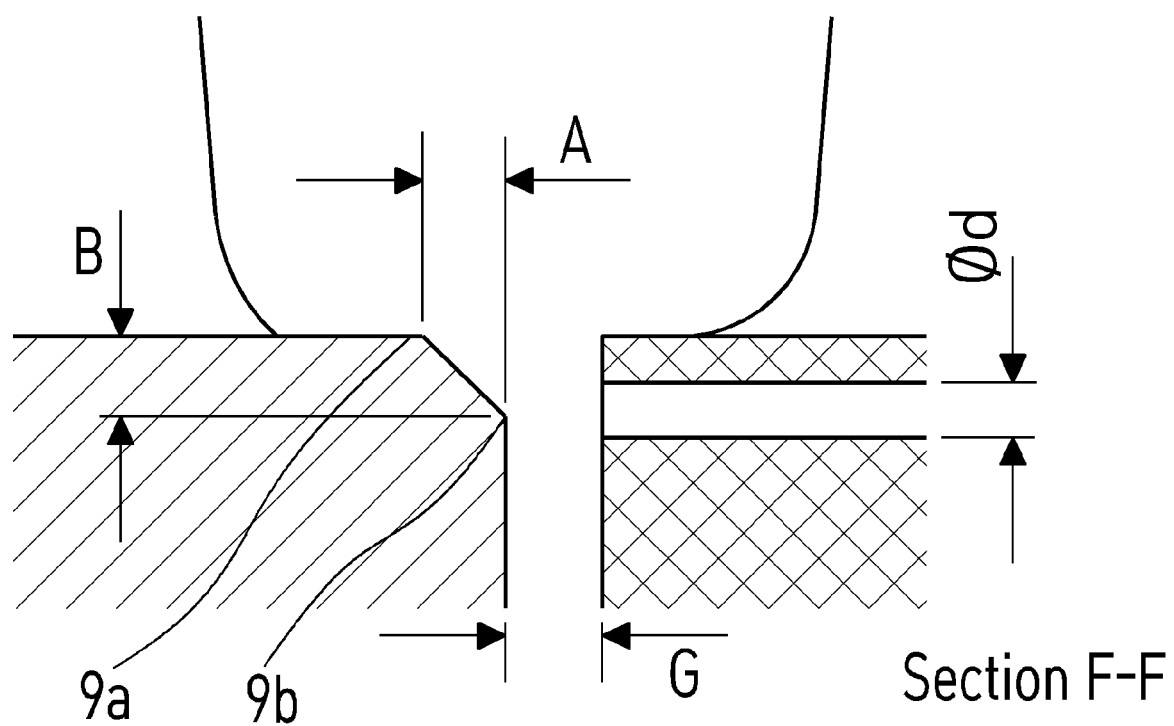
FIG. 12B schematically illustrates the turbomachine assembly of FIG. 11B and schematically depicts exemplary dimensions of the blade of the present technique.

As shown in FIG. 12B, in the blade 1, a slope (a/b) of the chamfer part 9 may be greater than or equal to 0.8 and less than or equal to 3, i.e., slope (a/b) of the chamfer part 9 may be between 0.8 and 3. The distance 'A', which may be referred to as horizontal distance or horizontal length of the chamfer part 9, is measured substantially parallel to the trailing-edge side edge of the platform 100, and 'B', which may be referred to as vertical distance or vertical length of the chamfer part 9, is measured perpendicular to the trailing-edge side edge of the platform 100 and to the upper surface of the platform.

As shown in FIG. 12A, in the blade 1, a ratio (C/f) of a chord length C of the airfoil 200 and a length f of a first non-chamfered edge region 99 (leading edge non-chamfered region 99) of the suction-side lateral surface 105 of the platform 100 may be greater than or equal to 1.03 and less than or equal to 5.9, i.e. between 1.03 and 5.9.

The first non-chamfered edge region 99 may be understood as a region of the edge between the suction-side lateral surface 105 and the upper surface 101 of the platform 100 that is disposed laterally between the leading edge 206 of the airfoil 200 and the chamfer part 9 when viewed in a direction perpendicular to the chord C of the airfoil 200. The lengths C, f may be measured parallel to the chord C of the airfoil 200.

The chord length C may be between 30 mm (millimeter) and 300 mm, preferably between 30 mm and 220 mm. The value of 'A' as shown in FIG. 12A may be between 0.5 mm and 12 mm.

Figure 12C:
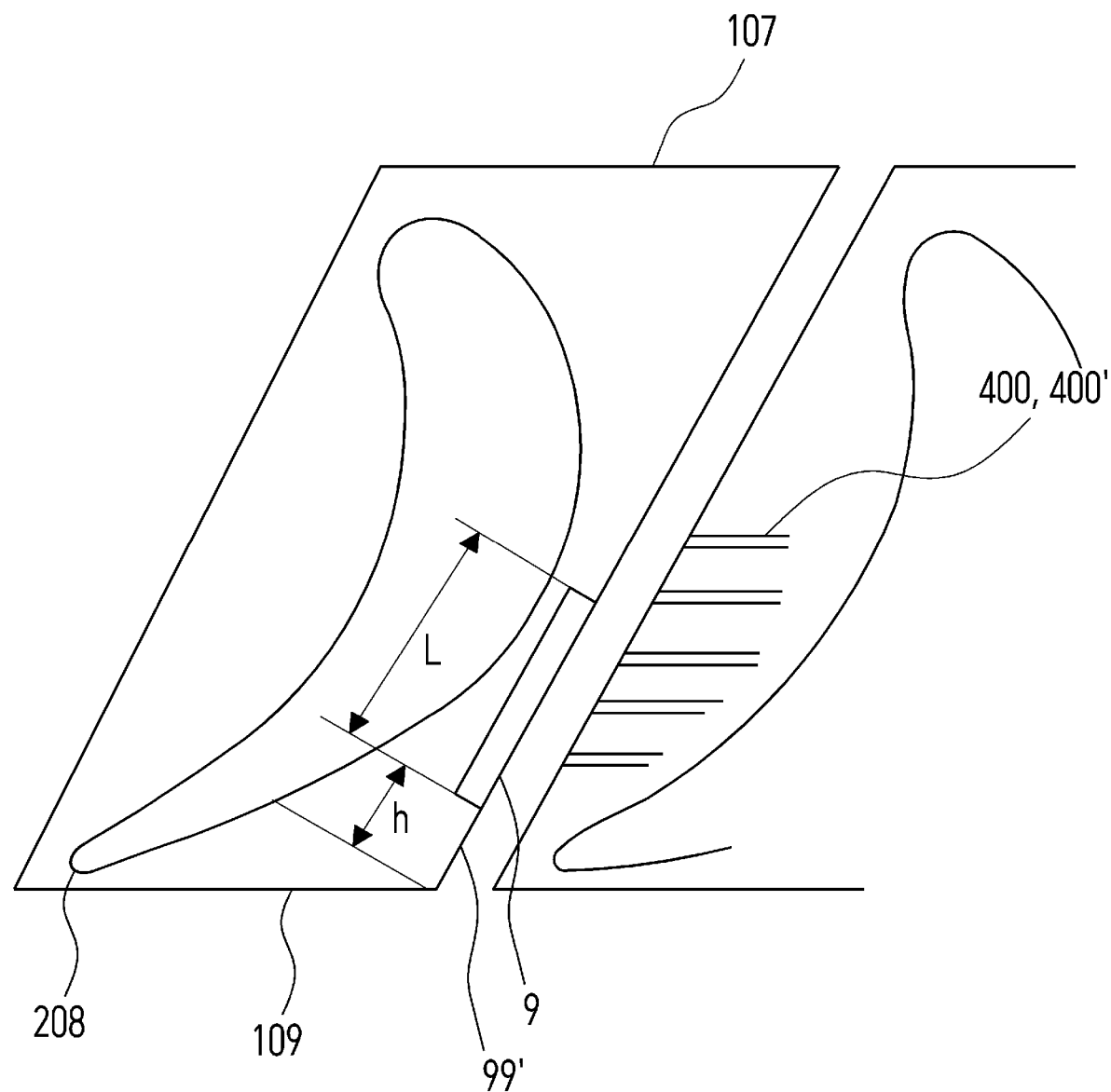
FIG. 12C schematically illustrates yet another exemplary embodiment of the turbomachine assembly of the present technique and schematically depicts exemplary dimensions of the blade of the present technique.
Figure 12D:
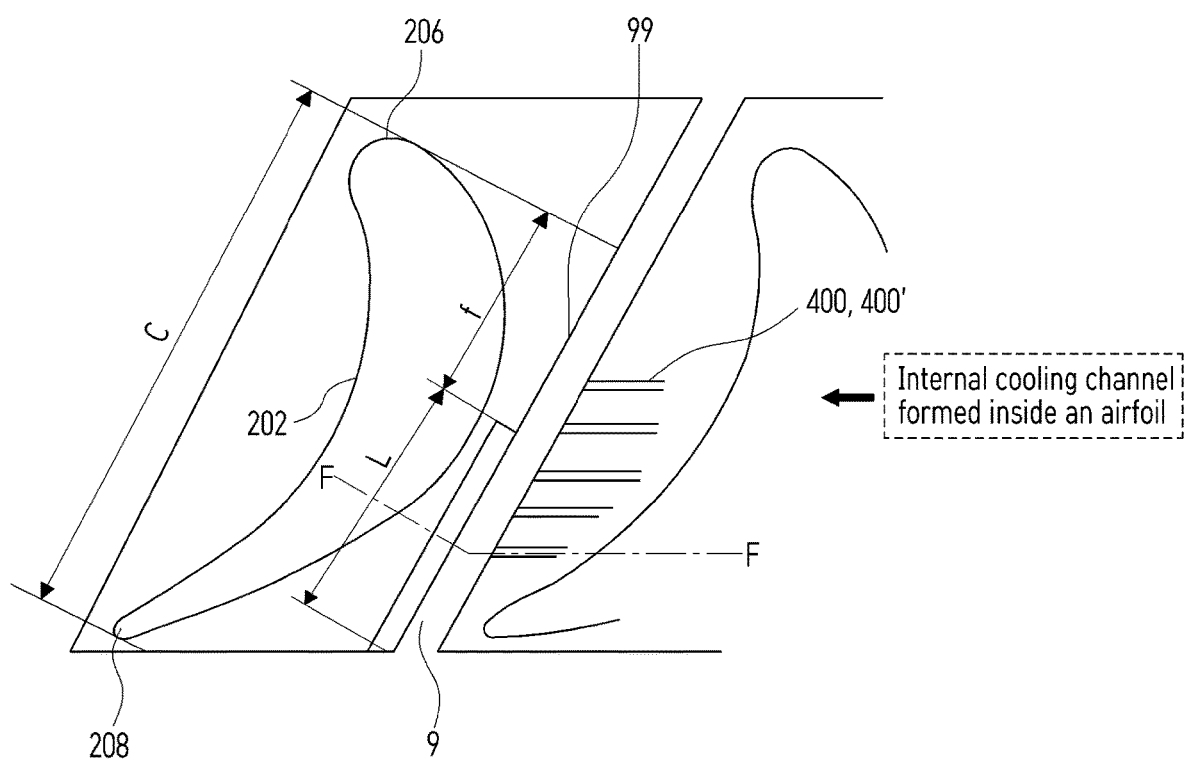
FIGS. 12D and 12E schematically illustrate still other exemplary embodiments of the turbomachine assembly of the present technique.
Figure 12E:
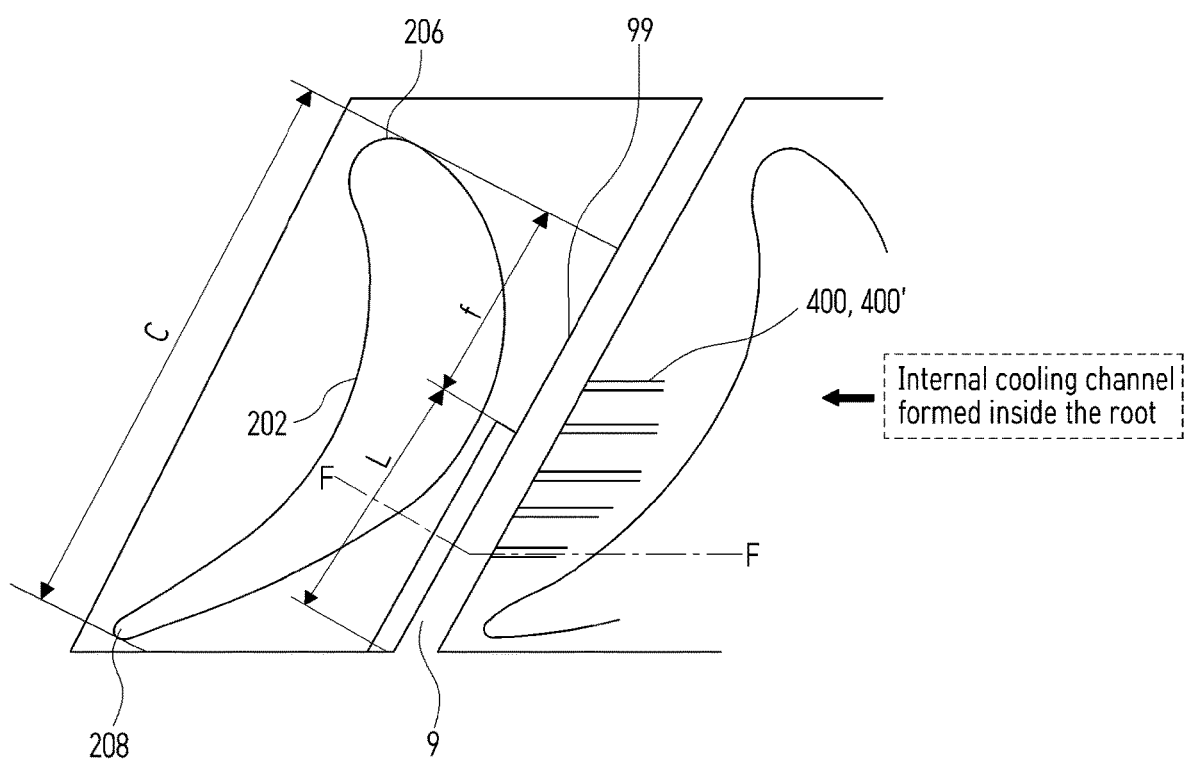

For the embodiments of the blade 1, in which the chamfer part 9 is spaced apart from the trailing-edge lateral surface 109, as shown in FIGS. 4A, 6 and 12C, a distance 'h' of a trailing edge non-chamfered region 99', or a second non-chamfered edge region 99', of the suction-side lateral surface 105 of the platform 100 may be greater than or equal to 1 mm to 100 mm, preferably 10 mm and less than or equal to 15 mm.

The trailing edge non-chamfered chord region 99' may be understood as a region of the edge between the suction-side lateral surface 105 and the upper surface 101 of the platform 100 that is laterally disposed between the trailing edge 208 of the airfoil 200 and the chamfer part 9 when viewed in a direction perpendicular to the chord C of the airfoil 200. The lengths C, f may be measured parallel to the chord C of the airfoil 200.

It may be noted that all the dimensions and ranges are exemplary and are not intended to limit the present technique. Dimensions and ranges other than those described hereinabove may be used in the present technique, and fall within the scope of the present technique, unless otherwise specified.

Referring to FIG. 2 and FIG. 9B, another exemplary embodiment of the present technique is described hereinafter.

As shown in FIG. 2, the platform 100 may include a lower surface 110 opposite to the upper surface 101 of the platform 100. The chamfer part 9 may be spaced apart from the lower surface 110 by a part 1051, as shown in FIG. 9B, of the suction-side lateral surface 105. In other words, the chamfer part 9 extends from the upper surface 101 of the platform 100 but does not extend up to the lower surface 110 of the platform 100.

The lower surface 110 of the platform 100 may be understood as the surface of the platform 100 from which the root 300 of the blade 1 extends.

Referring to FIG. 6, yet another exemplary embodiment of the present technique is described hereinafter.

As shown in FIG. 6, the blade 1 may include one or more cooling channels 400 formed in the platform 100. The cooling channels 400 may be completely embedded at their lateral surfaces in the platform 100. At least one of the one or more cooling channels 400 may include an outlet 401 for cooling air. The outlet 401 may be disposed at the pressure-side lateral surface 103 of the platform 100 and/or at the suction-side lateral surface 105 of the platform 100. The one or more cooling channels 400 of the platform may be fluidly connected to cooling channels (not shown) formed inside the airfoil 200 and/or inside the root 300 of the blade 1, and thus cooling air from the root 300 of the blade 1 and/or from the airfoil 200 of the blade 1 may flow into the one or more cooling channels 400 of the platform 100 and may exit the platform 100 at the pressure-side lateral surface 103 of the platform 100 through the outlet 401.

In the blade 1, a distance D2, depicted by reference sign D22 in FIG. 6, of the outlet 401 from the leading-edge lateral surface 107 of the leading-edge side 106 of the platform 100 may be less than a distance D1 of the chamfer part 9 from the leading-edge lateral surface 107 of the leading-edge side 106 of the platform 100. The distances D1, D2, D22 may be measured parallel to the chord C of the airfoil 200.

Optionally in addition to the aforementioned, a difference (D1-D22) between the distances D1, D22 may be less than the distance D22 of the outlet 401 from the leading-edge lateral surface 107 of the leading-edge side 106 of the platform 100. Simply put, the outlet 401 may be disposed closer to the chamfer part 9 than to the leading-edge lateral surface 107 of the leading-edge side 106 of the platform 100. The distances D1, D22 may be measured parallel to the chord C of the airfoil.

In other words, a horizontal distance between the outlet 401 and the chamfer part 9, measured perpendicularly to the leading-edge lateral surface 107 of the platform 100, may be less than a horizontal distance between the outlet 401 and leading-edge lateral surface 107 of the platform 100.

Alternatively, in the blade 1, a distance D2, depicted by reference sign D21 in FIG. 6, of the outlet 401 from the leading-edge lateral surface 107 of the platform may be equal to or greater than the distance D1 of the chamfer part 9 from the leading-edge lateral surface 107 of the platform 100, and equal to or lesser than a sum (D1+L) of the distance D1 of the chamfer part 9 from the leading-edge lateral surface 107 of the platform 100 and the length L of the chamfer part 9. The length L of the chamfer part 9 and the distances D1 and D21 may be measured parallel to the chord C of the airfoil 200.

Hereinafter, with reference to FIGS. 9A and 9B, an exemplary embodiment of a turbomachine assembly, for example, as shown in FIG. 2, of the present technique in which the blade 1, for example, as shown in any of FIGS. 4A, 5 and 6, of the present technique is incorporated. For comparison and ease of understanding, FIGS. 8A and 8B show a conventional turbomachine assembly in which a conventional blade, for example, the conventional blade 38' as shown in FIG. 3, is incorporated.

The turbomachine assembly according to the present technique, as exemplified by FIGS. 9A and 9B, hereinafter also referred to as the assembly, includes a plurality of blades arranged on the rotor disk 36 (shown in FIGS. 1 and 2). The plurality of blades includes at least one first blade 1a (shown in FIGS. 10A and 11A). The at least one first blade 1a is a blade according to any of the above embodiments of the blade 1 presented hereinabove according to the first aspect of the present technique, for example, any of the blades 1 of the present technique as exemplified by the examples of FIGS. 4A, 5 and 6. A cooling air flow path (for example a flow path for cooling air 5 shown in FIG. 4B) may be disposed adjacent to the suction-side lateral surface 105 of the first blade 1a.

The cooling air flow path may be partially defined by a turbomachine component other than the first blade 1a or may be defined by the root 300 of the first blade 1a or by the suction-side lateral surface 105 of the first blade 1a. The cooling air flow path may include a flow path for cooling air 5 that is used for cooling of another part of the gas turbine other than the first blade 1a, for example, for cooling a blade adjacent to the first blade 1a or has been used for another purpose, for example, used as seal purge air for a seal between the first blade 1a and the blade adjacent to the first blade 1a arranged on the rotor disk 36.

Figure 8A:
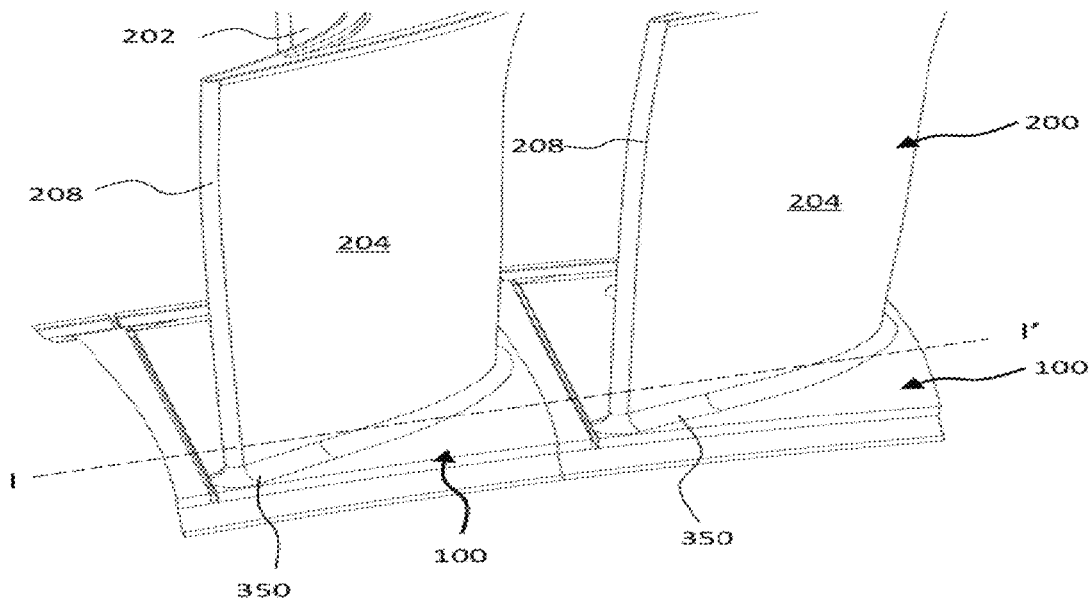
FIG. 8A is a perspective view illustrating a conventional turbomachine assembly in which a conventional blade as shown in FIG. 3 is incorporated.
Figure 8B:
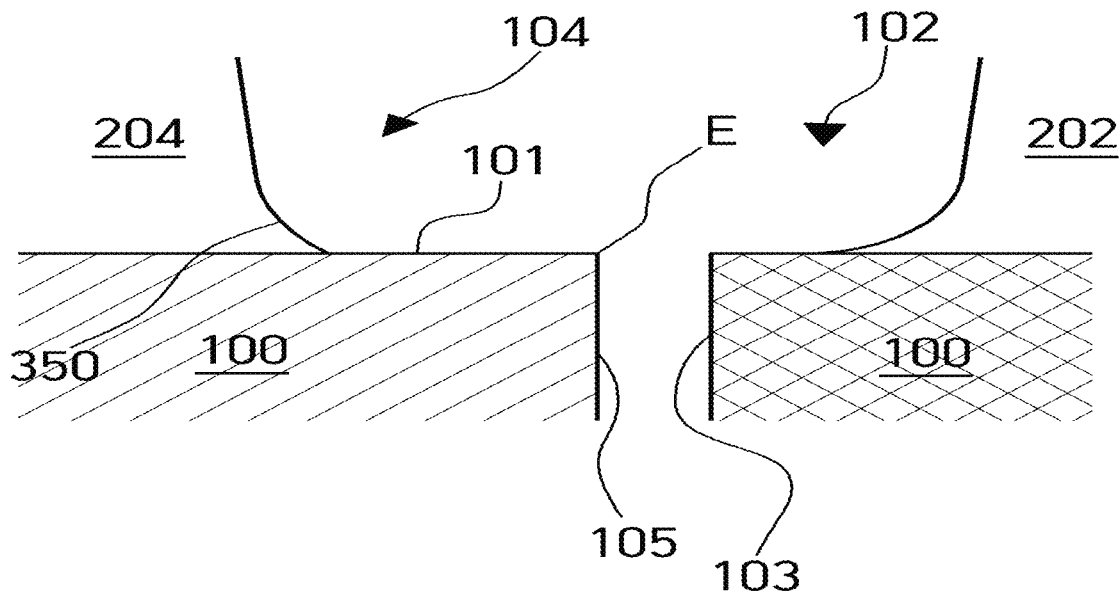
FIG. 8B illustrates a part of a cross-sectional view of the conventional turbomachine assembly of FIG. 8A, cross-sectioned at line I-I'.

As shown in FIGS. 9A and 9B, at least one of the blades of the assembly has the chamfer part 9 instead of a conventional edge E shown in FIGS. 8A and 8B.

Figure 10A:
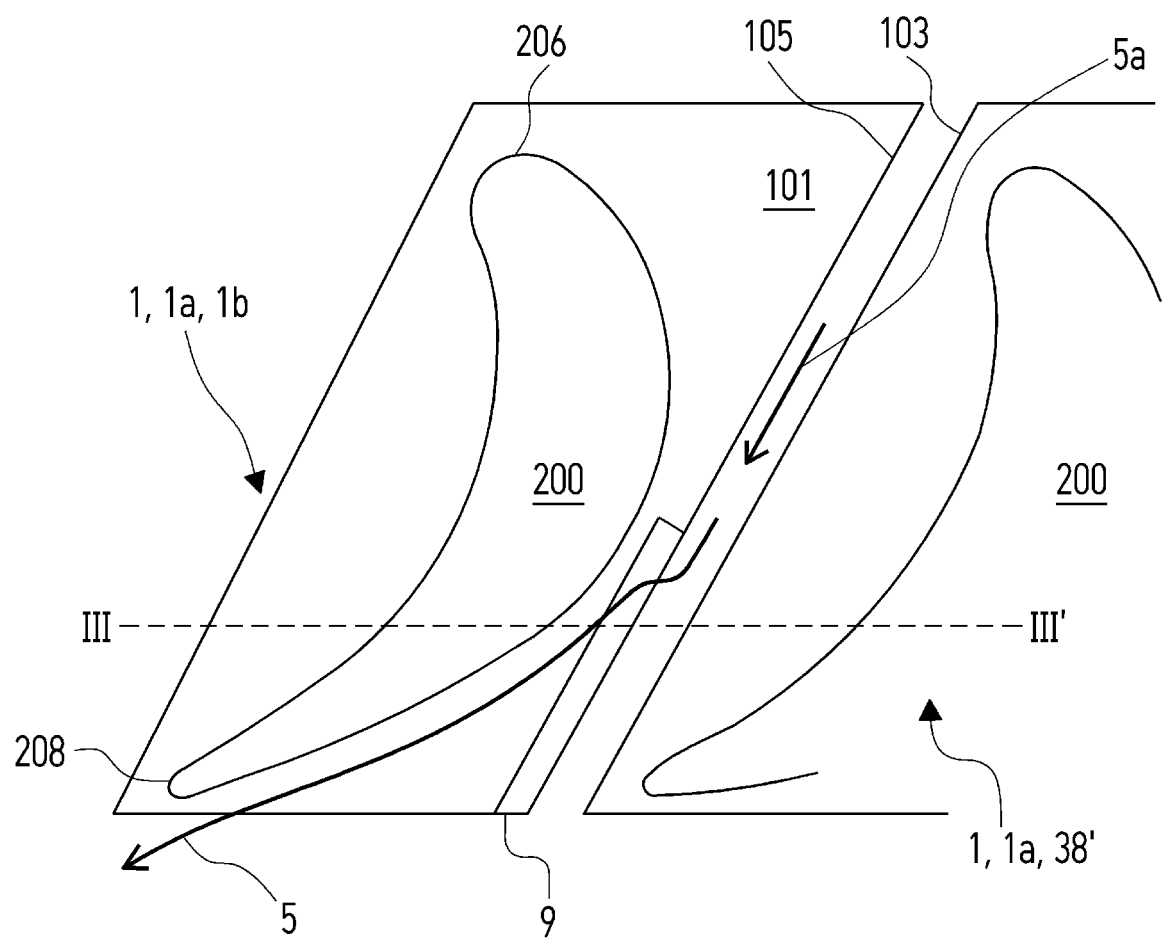
FIG. 10A schematically illustrates another exemplary embodiment of the turbomachine assembly of the present technique in which a blade of the present technique is incorporated.
Figure 10B:
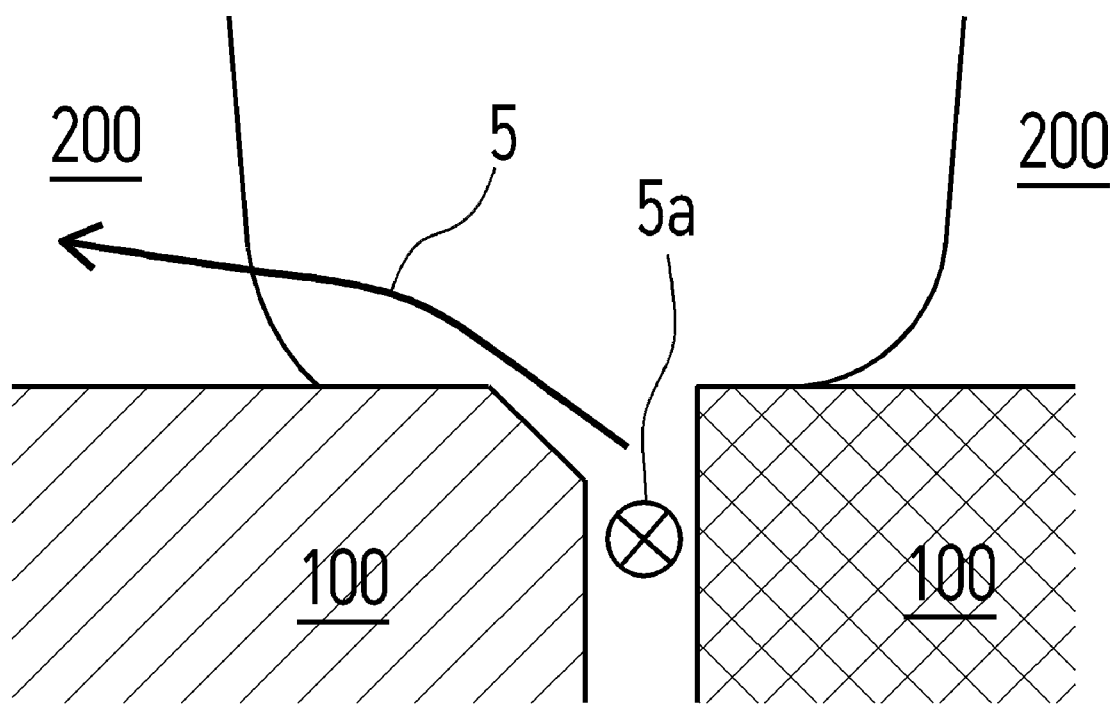
FIG. 10B illustrates a part of a cross-sectional view of the turbomachine assembly of FIG. 10A, cross-sectioned at line III-III'.

As depicted in FIGS. 10A and 10B, in the assembly all the blades may be the first blades 1a i.e. the blade 1 having the chamfer part 9 according to the present technique (although chamfer part 9 of one of the two blades of the assembly is not depicted), or one or more blades may be the first blades 1a while others may be the conventional blades 38' depicted in FIG. 3. Cooling air 5a present in-between the blades of the assembly and/or seal purge air 5a present in-between the blades of the assembly is guided by the chamfer part 9, as described hereinabove with reference to FIG. 4B.

Figure 11A:
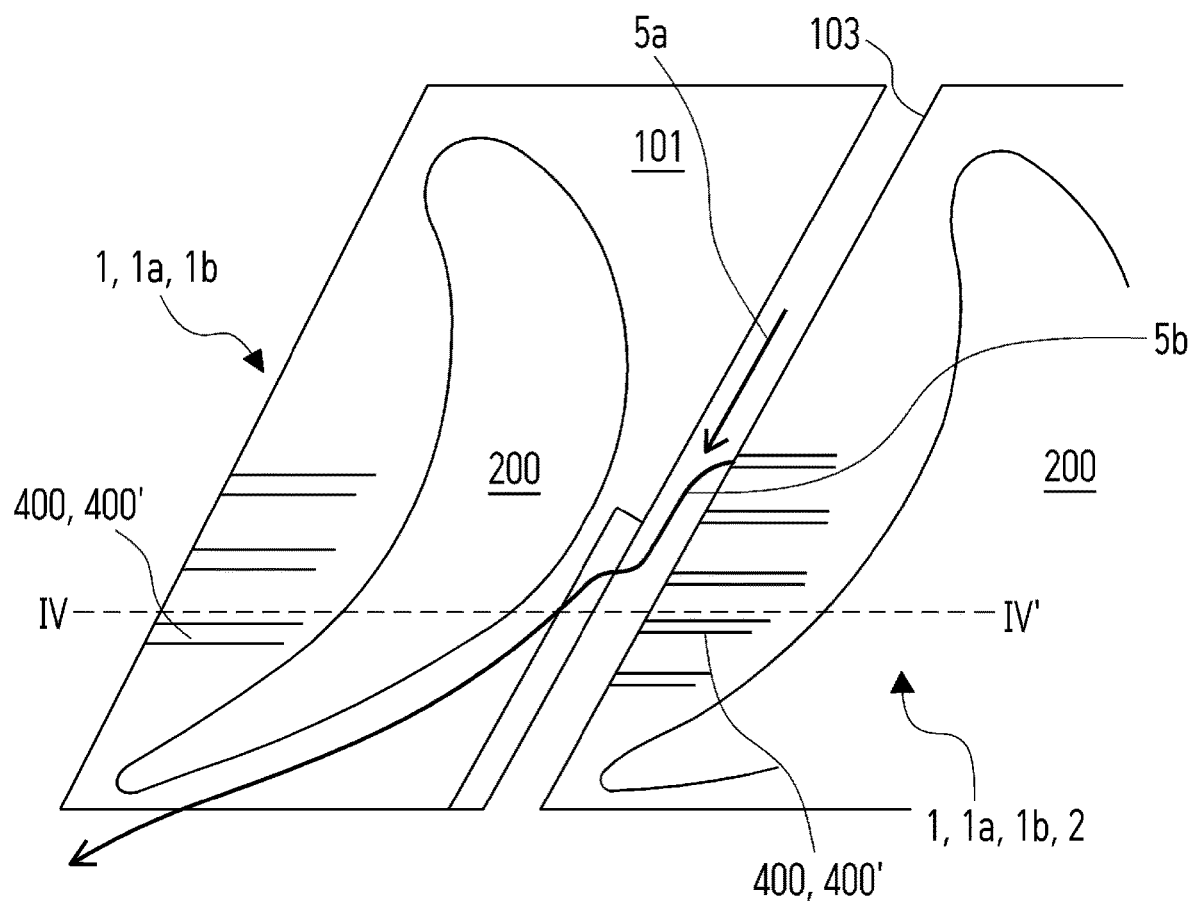
FIG. 11A schematically illustrates yet another exemplary embodiment of the turbomachine assembly of the present technique in which a blade of the present technique is incorporated.
Figure 11B:
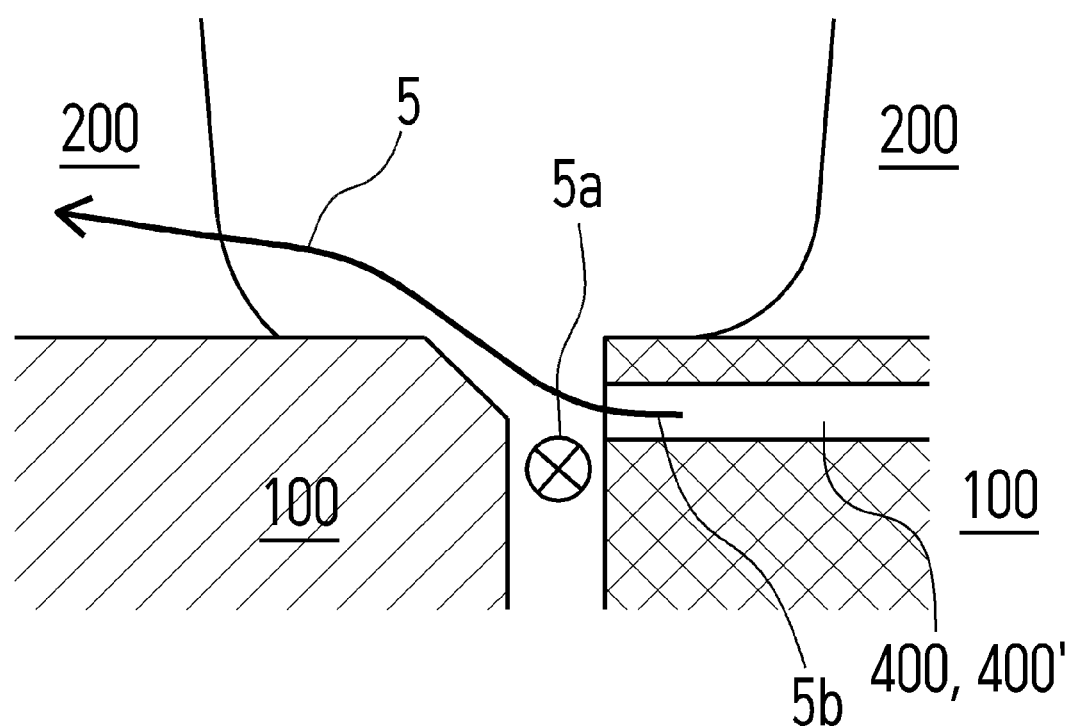
FIG. 11B illustrates a part of a cross-sectional view of the turbomachine assembly of FIG. 11A, cross-sectioned at line IV-IV'.

As depicted in FIGS. 11A and 11B, in the assembly, the plurality of blades may include at least one second blade 1b disposed adjacent to the at least one first blade 1a. The at least one second blade 1b may be the blade 1 comprising the chamfer part 9 as disclosed hereinabove in the first aspect of the present technique and may further include the one or more cooling channels 400 formed in the platform 100 and having the outlet 401 disposed at the pressure-side lateral surface 103 of the platform 100, as discussed hereinabove.

Simply put the second blade 1b is same as the first blade 1a however comprises the one or more cooling channels 400 formed in the platform 100 and having the outlet 401 disposed at the pressure-side lateral surface 103 of the platform 100. To explain further, and it may be noted that, the first blade 1a is the blade 1 having the chamfer part 9 and further may or may not include the cooling channels 400 having the outlets 401, whereas the second blade 1b is same as the blade 1 having the chamfer part 9 and further includes the cooling channels 400 having the outlets 401.

The cooling air flow path may be disposed between the second blade 1b and the suction-side lateral surface 105 of the first blade 1a. Cooling air 5a present in-between the blades 1a, 1b of the assembly and/or seal purge air 5a present in-between the blades 1a, 1b of the assembly and/or cooling air 5b exiting from the outlet 401 of the second blade 1b is guided by the chamfer part 9, as described hereinabove with reference to FIG. 4B. It may be noted that since the outlet 401 ejects the cooling air 5b towards the suction-side lateral surface 105, the cooling air is more efficiently guided by the chamfer part 9, as described hereinabove with reference to FIG. 4B.

Hereinafter, with reference to FIGS. 4A, 5 and 6 and FIG. 7, and FIGS. 11A and 11B, further exemplary embodiments of the assembly are described.

Figure 7:
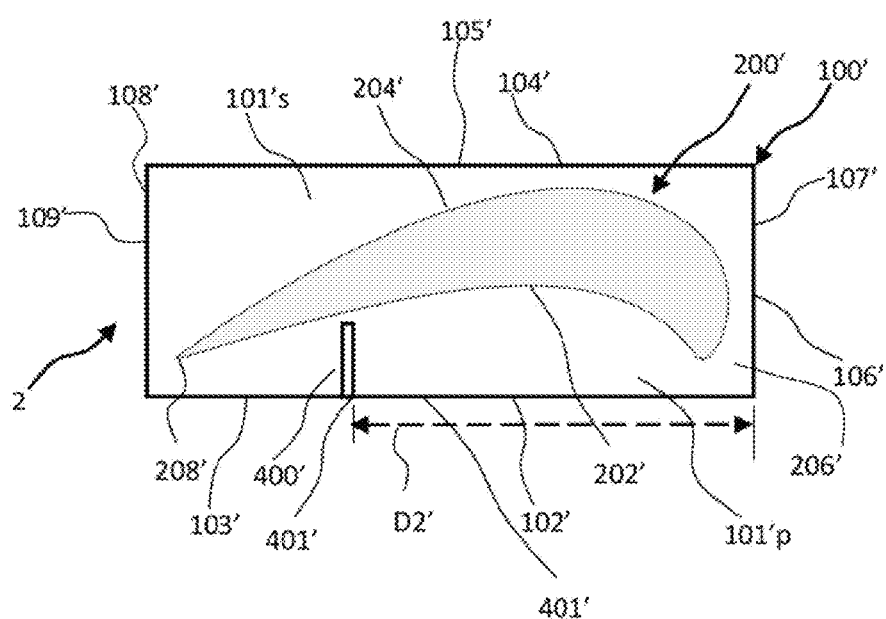
FIG. 7 schematically illustrates a top view of a third blade according to the present technique.

In the assembly, the plurality of blades may include at least one third blade 2, as shown in FIG. 7. The third blade 2 may be disposed adjacent to the at least one first blade 1a i.e. the blade 1 having the chamfer part 9.

Simply put the third blade 2 is a blade, for example a conventional blade 38' shown in FIG. 3, that includes one or more cooling channels 400' (similar to the cooling channels 400) formed in the platform 100' (similar to the platform 100') and having an outlet 401' (similar to the outlet 400') disposed at the pressure-side lateral surface 103' of the platform 100'. The third blade 2 may not include the chamfer part 9.

The at least one third blade 2, as shown in FIGS. 7 and 11A and 11B, may include a platform 100' and an airfoil 200' extending from the platform 100'. The platform 100' may include an upper surface 101' and the airfoil 200' may extend from the upper surface 101' of the platform 100'.

The airfoil 200' of the third blade 2 includes a pressure surface 202' and a suction surface 204'. The pressure surface 202' and the suction surface 204' meet each other at a leading edge 206' and a trailing edge 208' of the airfoil 200' of the third blade 2.

The platform 200' of the third blade 2 includes: a pressure side 102' disposed towards the pressure surface 202' of the airfoil 200', a suction side 104' disposed towards the suction surface 204' of the airfoil 200, a leading-edge side 106' disposed towards the leading edge 206' of the airfoil 200' and trailing-edge side 108' disposed towards the trailing edge 208' of the airfoil 200'.

The pressure side 102' of the platform 100' may include a part 101'p (hereinafter also referred to as the pressure-side part 101'p) of the upper surface 101' and a pressure-side lateral surface 103'. The suction side 104' of the platform 100' may include a part 101's (hereinafter also referred to as the suction-side part 101's) of the upper surface 101' and a suction-side lateral surface 105'. The third blade 2 further comprises one or more cooling channels 400' formed in the platform 100' of the third blade 2, and wherein at least one of the one or more cooling channels 400' of the third blade 2 comprises an outlet 401' for cooling air 5b and wherein the outlet 401' is disposed at the pressure-side lateral surface 103' of the platform 100' of the third blade 2.

As further shown in FIG. 7, in the assembly, a distance D2' of the outlet 401' from the leading-edge lateral surface 107' of the third blade 2 may be less than the distance D1 (as shown in FIG. 6) of the chamfer part 9 from the leading-edge lateral surface 107 of the first blade 1a. The distances D2' and D1 may be measured parallel to chords of the airfoils 200', 200 of the respective blades 2, 1.

Optionally in addition to the aforementioned, a difference between the distances D1, D2' may be less than the distance D2' of the outlet 401' from the leading-edge lateral surface 107' of the third blade 2. The distances D1, D2' may be measured parallel to chords of the airfoils 200, 200' of the respective blades 1a, 2. Simply put, the outlet 401' may be disposed closer to the chamfer part 9 than to the leading-edge lateral surfaces 107, 107'. The distances D1, D2' may be measured parallel to the chords C of the airfoils 200, 200' of the respective blades.

It may be noted that although FIG. 7 shows only one cooling channel 400' having the outlet 401', there may be a plurality of the cooling channels 401 each having the outlet 401'.

In another embodiment, in the assembly, the outlet 401' of the at least one of the one or more cooling channels 400' of the third blade 2 may be positioned directly facing the chamfer part 9 of the first blade 1a—as depicted in FIGS. 11A and 11B.

As shown in FIG. 12B, in the assembly, a distance G between a lower edge 9b of the chamfer part 9 of the at least one first blade 1a and the pressure-side lateral surface 103, 103' of the blade 1, 1b, 2 disposed adjacent to the at least one first blade 1a may be equal to or greater than 0.5 times and equal to or less than 3 times a horizontal distance A between the lower edge 9b of the chamfer part 9 and an upper edge 9a i.e. an edge or boundary of the chamfer part 9 adjoining the upper surface 101 of the platform 100.

It may be noted that above range is applicable whether the assembly includes only the first blades 1a or the second blades 1b, or includes the first blades 1a and the third blade 2.

While the present technique has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope of the appended claims. The scope of the invention is, therefore, indicated by the following claims rather than by the foregoing description. All changes, modifications, and variations coming within the meaning and range of equivalency of the claims are to be considered within their scope.

What is claimed is:

1. A blade for a gas turbine, the blade comprising:
   a root;
   a platform having an upper surface;
   an airfoil extending from the upper surface of the platform, the airfoil comprising a pressure surface and a suction surface meeting at a leading edge and a trailing edge; and
   a plurality of cooling channels internally formed inside the platform, the plurality of cooling channels being fluidly connected to internal cooling channels formed inside the airfoil or the root of the blade,
   wherein the platform further comprises:
   a pressure side disposed towards the pressure surface of the airfoil and comprising a pressure-side lateral surface;
   a suction side disposed towards the suction surface of the airfoil and comprising a suction-side lateral surface;
   a leading-edge side disposed towards the leading edge of the airfoil and comprising a leading-edge lateral surface; and a trailing-edge side disposed towards the trailing edge of the airfoil and comprising a trailing-edge lateral surface;

wherein at least a part of an edge between the suction-side lateral surface and the upper surface of the platform comprises a chamfer part, and wherein the plurality of cooling channels comprises a plurality of outlets including a first and a second outlet for cooling air from the internal cooling channels of the airfoil or the root of the blade including a first and a second outlet, the plurality of outlets being disposed at the pressure-side lateral surface of the platform to discharge the cooling air toward the suction-side lateral surface of an adjacent blade, so that the cooling air from the internal cooling channels of the airfoil or the root of the blade discharged through the plurality of outlets of the blade is guided by a chamfer part of the adjacent blade, wherein the first outlet of the plurality of outlets is positioned directly facing the chamfer part of the adjacent blade, wherein the second outlet of the plurality of outlets is positioned such that a distance between the leading-edge lateral surface and the second outlet of the plurality of outlets is less than a distance between the leading-edge lateral surface and the chamfer part of the adjacent blade.

2. The blade according to claim 1, wherein the chamfer part of the blade is spaced apart from the leading-edge lateral surface.

3. The blade according to claim 1, wherein the chamfer part of the blade is spaced apart from the trailing-edge lateral surface.

4. The blade according to claim 1, wherein the chamfer part of the blade is continuous with the trailing-edge lateral surface or extends to the trailing-edge lateral surface.

5. The blade according to claim 1,
wherein a ratio of a chord length of the airfoil and a length of the chamfer part of the blade is greater than or equal to 1.05 and less than or equal to 8.1, where the lengths are measured parallel to a chord of the airfoil; and/or
wherein a slope of the chamfer part of the blade is greater than or equal to 0.8 and less than or equal to 3; and/or
wherein a ratio of the chord length of the airfoil and a length of a first non-chamfered edge region is greater than or equal to 1.03 and less than or equal to 5.9, where the first non-chamfered edge region is a part of the edge between the suction-side lateral surface and the upper surface of the platform and is laterally disposed between a starting point of the chord of the airfoil at the leading edge of the airfoil and the chamfer part of the blade, when viewed in a direction perpendicular to the chord of the airfoil, and where the lengths are measured parallel to the chord of the airfoil.

6. The blade according to claim 1, wherein the platform comprises a lower surface opposite to the upper surface, and wherein the chamfer part of the blade is spaced apart from the lower surface by a part of the suction-side lateral surface.

7. The blade according to claim 1, further comprising a fillet disposed around at least a part of the airfoil at a region in which the airfoil joins the platform, and wherein at least a part of the fillet is disposed between the airfoil and the chamfer part of the blade.

8. A turbomachine assembly comprising a plurality of blades arranged on a rotor disk, each blade of the plurality of blades comprising:
a root;
a platform having an upper surface;
an airfoil extending from the upper surface of the platform, the airfoil comprising a pressure surface and a suction surface meeting at a leading edge and a trailing edge; and
a plurality of cooling channels internally formed inside the platform, the plurality of cooling channels being fluidly connected to internal cooling channels formed inside the airfoil or the root of the blade, wherein the platform further comprises:
a pressure side disposed towards the pressure surface of the airfoil and comprising a pressure-side lateral surface;
a suction side disposed towards the suction surface of the airfoil and comprising a suction-side lateral surface;
a leading-edge side disposed towards the leading edge of the airfoil and comprising a leading-edge lateral surface; and
a trailing-edge side disposed towards the trailing edge of the airfoil and comprising a trailing-edge lateral surface;

wherein at least a part of an edge between the suction-side lateral surface and the upper surface of the platform comprises a chamfer part, and wherein the plurality of cooling channels comprises a plurality of outlets including a first and a second outlet for cooling air from the internal cooling channels of the airfoil or the root of the blade including a first and a second outlet, the plurality of outlets being disposed at the pressure-side lateral surface of the platform to discharge the cooling air toward the suction-side lateral surface of an adjacent blade of the plurality of blades, so that the cooling air from the internal cooling channels of the airfoil or the root of the blade discharged through the plurality of outlets of the blade is guided by the chamfer part of the adjacent blade, wherein the first outlet of the plurality of outlets is positioned directly facing the chamfer part of the adjacent blade, wherein the second outlet of the plurality of outlets is positioned such that a distance between the leading-edge lateral surface and the second outlet of the plurality of outlets is less than a distance between the leading-edge lateral surface and the chamfer part of the adjacent blade.

9. A turbomachine assembly according to claim 8, wherein the chamfer part of the blade is spaced apart from the leading-edge lateral surface.

10. A turbomachine assembly according to claim 8, wherein the chamfer part of the blade is spaced apart from the trailing-edge lateral surface.

11. A turbomachine assembly according to claim 8, wherein the chamfer part of the blade is continuous with the trailing-edge lateral surface or extends to the trailing-edge lateral surface.

12. A turbomachine assembly according to claim 8
wherein a ratio of a chord length of the airfoil and a length of the chamfer part of the blade is greater than or equal to 1.05 and less than or equal to 8.1, where the lengths are measured parallel to a chord of the airfoil; and/or
wherein a slope of the chamfer part of the blade is greater than or equal to 0.8 and less than or equal to 3; and/or
wherein a ratio of the chord length of the airfoil and a length of a first non-chamfered edge region is greater than or equal to 1.03 and less than or equal to 5.9, where the first non-chamfered edge region is a part of the edge between the suction-side lateral surface and the upper surface of the platform and is laterally disposed between a starting point of the chord of the airfoil at the leading edge of the airfoil and the chamfer part of the blade, when viewed in a direction perpendicular to the chord of the airfoil, and where the lengths are measured parallel to the chord of the airfoil.

13. A turbomachine assembly according to claim 8, wherein the platform comprises a lower surface opposite to the upper surface, and wherein the chamfer part of the blade is spaced apart from the lower surface by a part of the suction-side lateral surface.

14. A turbomachine assembly according to claim 8, each blade further comprising a fillet disposed around at least a part of the airfoil at a region in which the airfoil joins the platform, and wherein at least a part of the fillet is disposed between the airfoil and the chamfer part of the blade.

15. A gas turbine comprising a turbomachine assembly, wherein the turbomachine assembly is according to claim 8.

\* \* \* \* \*

UNITED STATES PATENT AND TRADEMARK OFFICE
CERTIFICATE OF CORRECTION

Page 1 of 1

PATENT NO. : 11,668,195 B2
APPLICATION NO. : 17/149762
DATED : June 6, 2023
INVENTOR(S) : Herbert Brandl It is certified that error appears in the above-identified patent and that said Letters Patent is hereby corrected as shown below:

On the Title Page

Please add Item (30):
Country: GERMANY
Application No.: 10 2020 103 898.4
Priority Date: 02/14/2020

Signed and Sealed this
Sixth Day of May, 2025

Coke Morgan Stewart
*Acting Director of the United States Patent and Trademark Office*